United States Patent [19]

Tsutsui et al.

[11] Patent Number: 5,126,301
[45] Date of Patent: Jun. 30, 1992

[54] SOLID CATALYST FOR POLYMERIZING AN OLEFIN

[75] Inventors: Toshiyuki Tsutsui; Ken Yoshitsugu, both of Ohtake; Akinori Toyota; Norio Kashiwa, both of Iwakuni, all of Japan

[73] Assignee: Mitsui Petrochemical Industries, Inc., Tokyo, Japan

[21] Appl. No.: 492,341

[22] Filed: Mar. 12, 1990

Related U.S. Application Data

[63] Continuation of Ser. No. 193,085, May 12, 1988, abandoned.

[30] Foreign Application Priority Data

May 13, 1987 [JP] Japan .................. 62-114409

[51] Int. Cl.⁵ .......................................... C08F 4/649
[52] U.S. Cl. .................................. 502/108; 502/103; 502/114; 502/115; 502/117; 502/120; 502/121; 502/123; 502/124; 502/125; 502/126; 502/127; 502/129; 502/132; 502/133; 526/124; 526/129
[58] Field of Search ............... 502/103, 108, 114, 115, 502/117, 120, 121, 123, 124, 125, 126, 127, 129, 132, 133

[56] References Cited

U.S. PATENT DOCUMENTS 4,295,991 10/1981 Wristers ..................... 502/108 X
4,558,023 12/1985 Brun et al. .................. 502/108
4,701,432 10/1987 Welborn ..................... 502/115 X Primary Examiner—Patrick P. Garvin
Attorney, Agent, or Firm—Sherman and Shalloway

[57] ABSTRACT

A solid catalyst for polymerizing an olefin is prepared from an organometallic compound, a fine-particle carrier, an aluminoxane, a compound of group IVB transition metal in periodic table, and an olefin polymer produced in a preliminary polymerization. The catalyst has a high polymerization activity and is capable of producing an olefin polymer having a narrow molecular-weight distribution. When the catalyst is used for producing an olefin copolymer, the resulting copolymer has both narrow molecular-weight distribution and composition distribution.

84 Claims, No Drawings

SOLID CATALYST FOR POLYMERIZING AN OLEFIN

This application is a continuation of application Ser. No. 193,085, filed May 12, 1988, abandoned.

BACKGROUND OF THE INVENTION

The present invention relates to a solid catalyst for polymerizing an olefin. Particularly, the present invention relates to a solid catalyst which can polymerize an olefin at a high polymerizing activity and produce a high molecular weight olefin polymer even when aluminoxane content of the catalyst is reduced. More particularly, the present invention relates to a solid catalyst for polymerizing an olefin which can produce a spherical olefin polymer having a good particle size distribution as well as excellent bulk density when slurry polymerization or gas-phase polymerization, particularly gas-phase polymerization is carried out. The present invention further relates to a solid catalyst which can polymerize an olefin at a high polymerizing activity and produce an olefin polymer having a narrow molecular-weight distribution or an olefin copolymer having a narrow composition distribution as well as the molecular-weight distribution when applied to a copolymerization of two or more olefins.

α-olefin polymers, particularly ethylene polymer and ethylene-α-olefin copolymer have generally been prepared by a known process wherein ethylene is polymerized, or ethylene and an α-olefin are copolymerized under the presence of a titanium-based catalyst comprising a titanium compound and an organoaluminum compound or a vanadium-based catalyst comprising a vanadium compound and an organoaluminum compound.

A new series of Ziegler catalysts comprising a zirconium compound and an aluminoxane have also been recently proposed for polymerization of an olefin.

Japanese Patent Application Kokai No. 58-19309 describes a process for polymerizing ethylene and at least one $C_{3-12}$ α-olefin at a temperature of from $-50°$ to $200°$ C. under the presence of a catalyst comprising a transition metal-containing compound represented by the formula:

(cyclopentadienyl)$_2$MeRHal wherein R is selected from cyclopentadienyl, $C_{1-8}$ alkyl, and halogen, Me is a transition metal, and Hal is a halogen, a linear aluminoxane represented by the formula:

Al$_2$OR$_4$(Al(R)—O)$_n$ wherein R is methyl or ethyl, and n is a number of 4 to 20, and a cyclic aluminoxane represented by the formula:

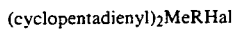
(Al(R)—O)$_{n+2}$ wherein R and n are as defined above. There is also described that ethylene should be polymerized under the presence of a small amount, that is, up to 10% by weight of an α-olefin having a somewhat longer chain or a mixture thereof to adjust a density of the resulting polyethylene.

Japanese Patent Application Kokai No. 59-95292 describes processes for preparing a linear aluminoxane represented by the formula:

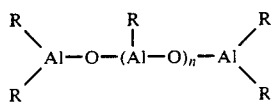

wherein n is a number of 2 to 40 and R is a $C_{1-8}$ alkyl, and a cyclic aluminoxane represented by the formula:

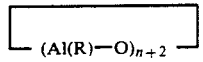
(Al(R)—O)$_{n+2}$ wherein n and R are as described above. There is also disclosed that at least 25 million grams of polyethylene may be produced per 1 g of transition metal per hour when an olefin is polymerized under the presence of a mixture of, for example, methylaluminoxane prepared as described above and a bis(cyclopentadienyl) compound containing titanium or zirconium.

Japanese Patent Application Kokai 60-35005 discloses a process for preparing an olefin-polymerization catalyst comprising effecting a reaction between a magnesium compound and an aluminoxane compound represented by the formula:

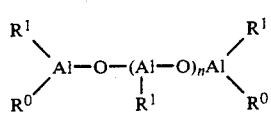

wherein $R^1$ is a $C_{1-10}$ alkyl radical, and $R^0$ may represent $R^1$ or, taken together, form —O—; chlorinating the reaction product; and treating the product with Ti, V, Zr, or Cr-containing compound to produce an olefin-polymerizing catalyst. There is also disclosed that said catalyst is particularly preferable for copolymerizing ethylene with a $C_{3-12}$ α-olefin.

Japanese Patent Application Kokai No. 60-35006 discloses a catalyst system for polymers blended in a reactor which comprises a combination of (a) a mono-, di- or tri-cyclopentadienyl compound of at least two different transition metals, or a derivative thereof, and (b) an alumoxane (aluminoxane). Example 1 of this application discloses that a polyethylene having a number average molecular weight of 15,300, a weight average molecular weight of 36,400, and propylene content of 3.4% may be prepared by polymerizing ethylene and propylene by using bis(pentamethylcyclopentadietnyl)-zirconium dimethyl and an alumoxane as catalyst. Example 2 discloses that a blend of polyethylene and ethylene-propylene copolymer having a number average molecular weight of 2,000, a weight average molecular weight of 8,300, and propylene content of 7.1 mol % comprising toluene-soluble portion having a number average molecular weight of 2,200, a weight average molecular weight of 11,900, and propylene content of 30 mol % and toluene-insoluble portion having a number average molecular weight of 3,000, a weight average molecular weight of 7,400, and propylene content of 4.8 mol % may be prepared by polymerizing ethylene and propylene by using bis(pentamethylcyclopentadienyl)zirconium dichloride, bis(methylcyclopentadienyl)zirconium dichloride, and an alumoxane as catalyst. Example 3 discloses a blend of LLDPE and ethylene-propylene copolymer comprising a soluble portion having a molecular weight distribution ($\overline{Mw}/\overline{Mn}$) of 4.57 and propylene content of 20.6 mol %, and an insoluble portion having a molecular weight distribution of 3.04 and propylene content of 2.9 mol %.

Japanese Patent Application Kokai No. 60-35007 describes a process for polymerizing ethylene either alone or together with an α-olefin having at least 3 carbon atoms under the presence of a catalyst containing a metallocene and a cyclic alumoxane represented by the formula:

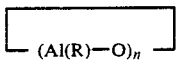

wherein R is a $C_{1-5}$ alkyl radical and n is an integer of 1 to about 20, or a linear alumoxane represented by the formula:

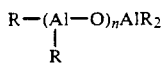

wherein R and n are as described above. The polymer prepared by such a process has a weight average molecular weight of about 500 to about 1,400,000 and a molecular-weight distribution of 1.5 to 4.0.

Japanese Patent Application Kokai No. 60-35008 discloses that a polyethylene or an ethylene-$C_{3-10}$ α-olefin copolymer having a wide molecular-weight distribution may be prepared by using a catalyst system containing at least two metallocenes and an aluminoxane. There is also disclosed that said copolymer has a molecular-weight distribution ($\overline{Mw}/\overline{Mn}$) of 2 to 50.

The catalysts comprising a transition metal compound and an aluminoxane as proposed in the above-mentioned patent applications are provided with a significantly superior polymerization activity compared to the conventional catalyst systems prepared from a transition metal compound and an organoaluminum compound. These catalysts, however, are mostly soluble in the reaction system, and frequently require adoption of solution polymerization system.

On the other hand, attempts have been made to polymerize an olefin in dispersion or gas-phase polymerization systems by using catalysts wherein one or both of said transition metal compound and said aluminoxane are supported on a porous carrier of an inorganic oxide such as silica, silica-alumina, and alumina.

For example, aforementioned Japanese Patent Application Kokai Nos. 60-35006, 60-35007 and 60-35008 disclose that the transition metal compound and the aluminoxane supported on a carrier such as silica, silica-alumina, and alumina can also be used as catalysts.

Japanese Patent Application Kokai Nos. 60-106808 and 60-106809 disclose a process for preparing a composition comprising a polyethylene-based polymer and a filler which involves preliminarily contacting a high-activity catalyst component containing titanium and/or zirconium which is soluble in a hydrocarbon solvent with a filler, and then polymerizing ethylene or copolymerizing ethylene and an α-olefin under the presence of the thus treated catalyst component, an organoaluminum compound, and a filler which has an affinity for a polyolefin.

Japanese Patent Application Kokai No. 61-31404 discloses a process for polymerizing ethylene or copolymerizing ethylene and an α-olefin under the presence of a mixed catalyst comprising a transition metal compound and a product obtained by reacting a trialkylaluminum and water under the presence of silicon dioxide or aluminum oxide.

Japanese Patent Application Kokai No. 61-276805 discloses a process for polymerizing an olefin under the presence of a catalyst comprising a reaction mixture between an inorganic oxide containing surface hydroxyl radical such as silica and a reaction mixture obtained by reacting a zirconium compound and an aluminoxane with a trialkylaluminum.

Japanese Patent Application Kokai Nos. 61-108610 and 61-296008 disclose a process for polymerizing an olefin under the presence of a catalyst comprising a transition metal compound such as a metallocene and an aluminoxane supported on a carrier such as an inorganic oxide.

However, when an olefin is polymerized or copolymerized in a dispersion or gas-phase polymerization system by utilizing the carrier-supported solid catalyst components as mentioned above, polymerization activity is markedly reduced and the properties inherent to the catalyst comprising the transition metal compound catalyst component and the aluminoxane catalyst component are not fully exerted. Powder properties such as bulk density of the thus prepared polymer were also insufficient. Moreover, the above-mentioned catalysts are attended by a practical problem that a large amount of expensive aluminoxane was required to achieve high polymerization activity, and the polymerization activity was low when a small amount of aluminoxane was used.

It has been found that an adoption of a particular carrier-supported solid catalyst component may enable a production of catalysts having a high polymerization activity even when a smaller amount of the expensive aluminoxane is used in the catalyst. It has also been found that such catalysts are capable of producing an olefin polymer having excellent powder properties and narrow molecular-weight distribution or an olefin copolymer having both narrow molecular-weight distribution and composition distribution when applied to a copolymerization of two or more olefins, and particularly, ethylene polymer or an ethylene-α-olefin copolymer having excellent powder properties and narrow molecular-weight/composition distribution.

SUMMARY OF THE INVENTION

According to the present invention, there is provided a solid catalyst for polymerizing an olefin prepared from an organometallic compound, a fine-particle carrier, an aluminoxane, a compound of group IVB transition metal in periodic table, and, an olefin polymer produced in a preliminary polymerization.

DETAILED DESCRIPTION OF THE INVENTION

The present invention is hereinafter described in detail.

The term polymerization used herein may include not only homopolymerization but also copolymerization. Similarly, the term polymer may include both homopolymer and copolymer.

The olefin-polymerizing solid catalyst according to the present invention is prepared from essential components of an organometallic compound, a fine-particle carrier, an aluminoxane, a group IVB transition metal compound, and an olefin polymer produced in a preliminary polymerization. The solid catalyst, however, may additionally contain optional components such as an electron donor.

The fine particle carrier constituting the olefin-polymerizing solid catalyst according to the present invention is an inorganic or organic fine-particle carrier having an average particle diameter generally in the range of from 1 to 300 μm, and preferably from 10 to 200 μm.

The inorganic fine-particle carrier may preferably be an oxide such as $SiO_2$, $Al_2O_3$, MgO, $ZrO_2$, $TiO_2$, and a mixture of any of these oxides. Among these, a carrier primarily comprising at least an oxide selected from the group consisting of $SiO_2$, $Al_2O_3$, and MgO may preferably be employed. The inorganic oxide carrier is calcined generally at 150° to 1000° C., preferably at 200° to 800° C. for 2 to 20 hours prior to its use.

The organic fine-particle carrier may comprise an organic polymer, for example, a polyolefin such as polyethylene, polypropylene, poly-1-butene, poly-4-methyl-1-pentene, and a polystyrene.

The organometallic compound constituting the olefin-polymerizing catalyst of the present invention may typically be an organoaluminum, organoboron, organomagnesium, organozinc, organolithium, and the like. Among these, the preferred compounds are organoaluminum compounds, especially those including a hydrocarbon radical other than n-alkyl radical. To obtain a high activity of a solid catalyst, the use of an organoaluminum compound is effective when a ratio of the aluminum content in an aluminoxane to the aluminum content in an organoaluminum compound is in the range of 1.25 to 5.0. Examples of the hydrocarbon radicals other than the n-alkyl radical include branched alkyl radicals such as isoalkyl radicals, cycloalkyl radicals, aryl radicals, and the like. Illustrative organoaluminum compounds are trialkylaluminums such as triisopropylaluminum, triisobutylaluminum, tri(2-methylbutyl)aluminum, tri(3-methylbutyl)aluminum, tri(2-methylpentyl)aluminum, tri(3-methylpentyl)aluminum, tri(4-methylpentyl)aluminum, tri(2-methylhexyl)aluminum, tri(3-methylhexyl)aluminum, tri(2-ethylhexyl)aluminum; tricycloalkyl aluminums such as tricyclohexylaluminum; triarylaluminums such as triphenylaluminum, tritolylaluminum; dialkylaluminum hydrides such as diisobutylaluminum hydride; alkylaluminum alkoxides such as isobutylaluminum methoxide, isobutylaluminum ethoxide, isobutylaluminum isopropoxide; etc. Among these organoaluminum compounds, aluminum compounds including branched alkyl radical, particularly trialkylaluminum compounds are preferred. Also preferred are isoprenylaluminums represented by the general formula:

$$(iso\text{-}C_4H_9)_xAl_y(C_5H_{10})_z$$

wherein x, y and z are independently positive integers provided that $Z \geq 2x$. Aluminoxanes prepared by reacting the above-mentioned organoaluminum compounds with water may also be employed.

The aluminoxane constituting the olefin-polymerizing catalyst of the present invention may be represented by the general formulae [I] and [II]:

$$R_2Al-(O-Al)_m-O-AlR_2 \quad [I]$$
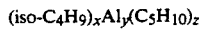

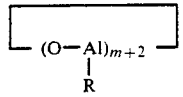

wherein R is a $C_{1-20}$, preferably a $C_{1-4}$ hydrocarbon radical, and m has a value of 2 to 50, preferably 4 to 40, and most preferably 6 to 30. The hydrocarbon radicals represented by R include methyl, ethyl, propyl, isopropyl, isopropenyl, n-butyl, sec-butyl, tert-butyl, pentyl, hexyl, octyl, decyl, dodecyl, tridecyl, tetradecyl, hexadecyl, octadecyl, eicocyl, cyclohexyl, cyclooctyl, phenyl, ethylphenyl, etc. Among these, methyl, ethyl, and isobutyl are preferred, and methyl is most preferred. The aluminoxane may also be a halogenated aluminoxane wherein R in general formula [I] or [II] is partly a halogen atom such as chlorine and bromine with the proviso that the halogen content is up to 40% by weight, and preferably up to 30% by weight.

The aluminoxane represented by the general formula [I] or [II] may be prepared by conventional known processes including:

(1) a process comprising preparing a hydrocarbon medium suspension of a compound containing absorbed water such as water-containing silica and water-containing alumina, or a salt containing water of crystallization such as hydrated magnesium chloride, hydrated copper sulfate, hydrated aluminum sulfate, hydrated nickel sulfate, and hydrated cerous chloride; and adding a trialkylaluminum into said suspension for reaction; and (2) a process wherein water is directly reacted with a trialkylaluminum in a medium such as benzene, toluene, ethylether, and tetrahydrofuran.

Among these processes, process (1) is more preferable. A small amount of organometallic component may also be contained in the aluminoxane. For example, an organometallic compound such as a halogen-containing organoaluminum compound and organomagnesium compound may also be present with the trialkylaluminum.

The group IVB transition metal compound constituting the olefin-polymerizing solid catalyst of the present invention is a transition metal compound wherein the transition metal is selected from the group consisting of titanium, zirconium and hafnium. The transition metal compound may preferably be a titanium or zirconium compound, and more preferably be a zirconium compound.

The group IVB transition-metal compound may typically be a zirconium compound having a radical containing conjugated π electron as a ligand.

The zirconium compound having a radical containing conjugated π electron as a ligand is, for example, a compound represented by the formula [III]:

$$R^1{}_kR^2{}_lR^3{}_mR^4{}_nZr \quad [III]$$

wherein $R^1$ is an unsubstituted or substituted cycloalkadienyl radical; $R^2$, $R^3$ and $R^4$ are independently selected from the group consisting of substituted or unsubstituted cycloalkadienyl, aryl, alkyl, cycloalkyl and aralkyl radicals, halogen, hydrogen, $OR^a$, $SR^b$, $NR^c{}_2$ and $PR^d{}_2$, wherein $R^a$, $R^b$, $R^c$ and $R^d$ are independently hydrocarbon radicals selected from the group consisting of alkyl, cycloalkyl, aryl and aralkyl radicals or silyl radicals, with the proviso that $R^c$ and $R^d$ may, taken together, form a ring; k is at least 1; and the sum of k, l, m and n equals 4. When $R^2$ is an unsubstituted or substituted cycloalkadienyl radical, $R^1$ and $R^2$ may be bonded by an intervening lower alkylene radical. Examples of the cycloalkadienyl radicals include cyclopentadienyl, methylcyclopentadienyl, ethylcyclopentadienyl, dimethylcyclopentadienyl, pentamethylcyclopentadienyl, indenyl, tetrahydroindenyl, etc. Examples of the alkyl radicals include methyl, ethyl, propyl, isopropyl, butyl, hexyl, octyl, 2-ethylhexyl, decyl, oleil, etc. Examples of the aryl radicals include phenyl, tolyl, etc. Examples of the aralkyl radicals include benzyl, neophyl, etc. Examples of the cycloalkyl radicals include cyclopentyl, cyclohexyl, cyclooctyl, norbonyl, bicyclononyl, and an alkyl-substituted radical thereof. Examples of the silyl radicals include trimethylsilyl, triethylsilyl, phenyldimethylsilyl, triphenylsilyl, etc. Unsaturated aliphatic radical such as vinyl, allyl, propenyl, isopropenyl, and 1-butenyl, and unsaturated cycloaliphatic radicals such as cyclohexenyl may also be employed. Examples of the halogen atoms include fluorine, chlorine, bromine, etc. Examples of the lower alkylene radicals include methylene, ethylene, propylene, butylene, etc.

Examples of the zirconium compounds include:
bis(cyclopentadienyl)zirconium monochloride monohydride;
bis(cyclopentadienyl)zirconium monobromide monohydride;
bis(cyclopentadienyl)methylzirconium hydride;
bis(cyclopentadienyl)ethylzirconium hydride;
bis(cyclopentadienyl)cyclohexylzirconium hydride;
bis(cyclopentadienyl)phenylzirconium hydride;
bis(cyclopentadienyl)benzylzirconium hydride;
bis(cyclopentadienyl)neopentylzirconium hydride;
bis(methylcyclopentadienyl)zirconium monochloride monohydride;
bis(indenyl)zirconium monochloride monohydride;
bis(cyclopentadienyl)zirconium dichloride;
bis(cyclopentadienyl)zirconium dibromide;
bis(cyclopentadienyl)methylzirconium monochloride;
bis(cyclopentadienyl)ethylzirconium monochloride;
bis(cyclopentadienyl)cyclohexylzirconium monochloride;
bis(cyclopentadienyl)phenylzirconium monochloride;
bis(cyclopentadienyl)benzylzirconium monochloride;
bis(methylcyclopentadienyl)zirconium dichloride;
bis(tetramethylcyclopentadienyl)zirconium dichloride;
bis(indenyl)zirconium dichloride;
bis(indenyl)zirconium dibromide;
bis(cyclopentadienyl)zirconium diphenyl;
bis(cyclopentadienyl)zirconium dibenzyl;
bis(cyclopentadienyl)methoxyzirconium chloride;
bis(cyclopentadienyl)ethoxyzirconium chloride;
bis(cyclopentadienyl)butoxyzirconium chloride;
bis(cyclopentadienyl)-2-ethylhexoxyzirconium chloride;
bis(cyclopentadienyl)methylzirconium ethoxide;
bis(cyclopentadienyl)methylzirconium butoxide;
bis(cyclopentadienyl)ethylzirconium ethoxide;
bis(cyclopentadienyl)phenylzirconium ethoxide;
bis(cyclopentadienyl)benzylzirconium ethoxide;
bis(methylcyclopentadienyl)ethoxyzirconium chloride;
bis(indenyl)ethoxyzirconium chloride;
bis(cyclopentadienyl)ethoxyzirconium;
bis(cyclopentadienyl)butoxyzirconium;
bis(cyclopentadienyl)-2-ethylhexoxyzirconium;
bis(cyclopentadienyl)phenoxyzirconium chloride;
bis(cyclopentadienyl)cyclohexoxyzirconium chloride;
bis(cyclopentadienyl)phenylmethoxyzirconium chloride;
bis(cyclopentadienyl)methylzirconium phenylmethoxide;
bis(cyclopentadienyl)trimethylsiloxyzirconium chloride;
bis(cyclopentadienyl)triphenylsiloxyzirconium chloride;
bis(cyclopentadienyl)thiophenylzirconium chloride;
bis(cyclopentadienyl)thioethylzirconium chloride;
bis(cyclopentadienyl)bis(dimethylamide)zirconium;
bis(cyclopentadienyl)diethylamidezirconium chloride;
ethylenebis(indenyl)ethoxyzirconium chloride;
ethylenebis(4,5,6,7-tetrahydro-1-indenyl)ethoxyzirconium chloride;
ethylenebis(indenyl)dimethylzirconium;
ethylenebis(indenyl)diethylzirconium;
ethylenebis(indenyl)diphenylzirconium;
ethylenebis(indenyl)dibenzylzirconium;
ethylenebis(indenyl)methylzirconium monobromide;
ethylenebis(indenyl)ethylzirconium monochloride;
ethylenebis(indenyl)benzylzirconium monochloride;
ethylenebis(indenyl)methylzirconium monochloride;
ethylenebis(indenyl)zirconium dichloride;
ethylenebis(indenyl)zirconium dibromide;
ethylenebis(4,5,6,7-tetrahydro-1-indenyl)dimethylzirconium;
ethylenebis(4,5,6,7-tetrahydro-1-indenyl)methylzirconium monochloride;
ethylenebis(4,5,6,7-tetrahydro-1-indenyl)zirconium dichloride;
ethylenebis(4,5,6,7-tetrahydro-1-indenyl)zirconium dibromide;
ethylenebis(4-methyl-1-indenyl)zirconium dichloride;
ethylenebis(5-methyl-1-indenyl)zirconium dichloride;
ethylenebis(6-methyl-1-indenyl)zirconium dichloride;
ethylenebis(7-methyl-1-indenyl)zirconium dichloride;
ethylenebis(5-methoxy-1-indenyl)zirconium dichloride;
ethylenebis(2,3-dimethyl-1-indenyl)zirconium dichloride;
ethylenebis(4,7-dimethyl-1-indenyl)zirconium dichloride;
ethylenebis(4,7-dimethoxy-1-indenyl)zirconium dichloride;
ethylenebis(indenyl)zirconium dimethoxide;
ethylenebis(indenyl)zirconium diethoxide;
ethylenebis(indenyl)methoxyzirconium chloride;
ethylenebis(indenyl)ethoxyzirconium chloride;
ethylenebis(indenyl)methylzirconium ethoxyde;
ethylene bis(4,5,6,7-tetrahydro-1-indenyl)zirconium dimethoxide;
ethylenebis(4,5,6,7-tetrahydro-1-indenyl)zirconium ethoxide;
ethylenebis(4,5,6,7-tetrahydro-1-indenyl)methoxyzirconium chloride;
ethylenebis(4,5,6,7-tetrahydro-1-indenyl)ethoxyzirconium chloride; and
ethylenebis(4,5,6,7-tetrahydro-1-indenyl)methylzirconium ethoxide.

Examples of the titanium compound include:
bis(cyclopentadienyl)titanium monochloride monohydride;
bis(cyclopentadienyl)methyltitanium hydride;
bis(cyclopentadienyl)phenyltitanium chloride;
bis(cyclopentadienyl)benzyltitanium chloride;
bis(cyclopentadienyl)titanium dichloride;

bis(cyclopentadienyl)titanium dibenzyl;
bis(cyclopentadienyl)ethoxytitanium chloride;
bis(cyclopentadienyl)butoxytitanium chloride;
bis(cyclopentadienyl)methyltitanium ethoxide;
bis(cyclopentadienyl)phenoxytitanium chloride;
bis(cyclopentadienyl)trimethylsiloxytitanium chloride;
bis(cyclopentadienyl)thiophenyltitanium chloride;
bis(cyclopentadienyl)bis(dimethylamide)titanium;
bis(cyclopentadienyl)diethoxytitanium;
ethylenebis(indenyl)titanium dichloride; and
ethylenebis(4,5,6,7-tetrahydro-1-indenyl)titanium dichloride.

Examples of the hafnium compound include:
bis(cyclopentadienyl)hafnium monochloride monohydride;
bis(cyclopentadienyl)ethylhafnium hydride;
bis(cyclopentadienyl)phenylhafnium chloride;
bis(cyclopentadienyl)hafnium dichloride;
bis(cyclopentadienyl)hafnium dibenzyl;
bis(cyclopentadienyl)ethoxyhafnium chloride;
bis(cyclopentadienyl)butoxyhafnium chloride;
bis(cyclopentadienyl)methylhafnium ethoxide;
bis(cyclopentadienyl)phenoxyhafnium chloride;
bis(cyclopentadienyl)thiophenylhafnium chloride;
bis(cyclopentadienyl)bis(diethylamide)hafnium;
ethylenebis(indenyl)hafnium dichloride; and
ethylenebis(4,5,6,7-tetrahydro-1-indenyl)hafnium dichloride.

The olefin polymer produced in the preliminary polymerization constituting the olefin-polymerizing solid catalyst of the present invention may be a polymer or a copolymer of ethylene, propylene, 1-butene, 1-hexene, 4-methyl-1-pentene, 1-octene, 1-decene, 1-dodecene, 1-tetradecene, 1-hexadecene, 1-octadecene, 1-eicocene, etc. Among these, ethylene polymer and a copolymer of ethylene and a C3-10 α-olefin are preferred.

The electron donor which may optionally be contained as a component of the olefin-polymerizing solid catalyst of the present invention may typically be selected from carboxylic acids, esters, ethers, ketones, aldehydes, alcohols, phenols, acid amides, oxygen-containing compounds such as those containing metal-O-C bond, the metal being aluminum, silicon, etc., nitriles, amines, phosphines, etc.

As described above, the olefin-polymerizing solid catalyst of the present invention is prepared from the fine-particle carrier, the group IVB transition metal compound, the organometallic compound, the aluminoxane, the α-olefin polymer prepared by the preliminary polymerization, and the optional electron donor. The sum of the metal atoms constituting the organometallic compound and the aluminum atoms constituting the aluminoxane may be from 0.01 to 3 gram atoms, preferably from 0.05 to 2 gram atoms, and most preferably from 0.1 to 1 gram atoms per 100 g of the fine-particle carrier. The content of the transition metal compound calculated as transition metal atom may be from $3 \times 10^{-4}$ to $3 \times 10^{-1}$ gram atoms, preferably from $5 \times 10^{-4}$ to $5 \times 10^{-2}$ gram atoms, and most preferably from $1 \times 10^{-3}$ to $1 \times 10^{-2}$ gram atoms per 100 g of the fine-particle carrier. The content of the α-olefin polymer prepared by the preliminary polymerization may be from 5 to $1 \times 10^4$ g, preferably from 10 to $5 \times 10^3$ g, and most preferably from 20 to $3 \times 10^3$ g per 100 g of the fine-particle carrier. The solid catalyst may optionally contain from 0 to 1 mole, preferably from 0.1 to 0.6 mole of the electron donor per 1 gram atom of the transition metal atom (M). In the olefin-polymerizing solid catalyst of the present invention, the gram atom ratio of the sum of the metal atoms ($M_1$) constituting the organometallic compound and the aluminum atoms ($M_2$) constituting the aluminoxane to the transition metal atoms (M), namely, $(M_1+M_2)/M$ may be in the range of from 15 to 500, preferably from 20 to 200, more preferably 25 to 150, and most preferably from 30 to 100.

The olefin-polymerizing solid catalyst of the present invention may preferably be prepared by preliminarily polymerizing an α-olefin under the presence of the transition metal compound and the fine-particle carrier pretreated with the organometallic compound, particularly with the organometallic compound and the aluminoxane. Processes for preparing the fine-particle carrier pretreated with the organometallic compound and the aluminoxane include:

(1) treating the fine-particle carrier with the organometallic compound, and further treating the carrier with the aluminoxane;

(2) simultaneously treating the fine-particle carrier with the organometallic compound and the aluminoxane; and (3) treating the fine-particle carrier with the aluminoxane, and further treating the carrier with the organometallic compound.

Among these processes, the process (1) is preferable since this process is capable of producing an olefin-polymerizing solid catalyst exhibiting a particularly superior polymerization activity. In these processes, the fine-particle carrier is treated by utilizing a solution of the organometallic compound, a solution of a mixture of the organometallic compound and the aluminoxane, or a solution of the aluminoxane. In the solution of the organometallic compound, concentration of the organometallic compound is generally 0.05 to 3 gram atoms/liter, and preferably 0.1 to 1 gram atom/liter calculated as organometallic atom. In the solution of a mixture of the organometallic compound and the aluminoxane, concentration of the organometallic compound is generally 0.01 to 2 gram atoms/liter, and preferably 0.05 to 0.5 gram atoms/liter calculated as organometallic atom, and concentration of the aluminoxane is generally 0.02 to 2 gram atoms/liter, and preferably 0.1 to 1 gram atom/liter calculated as aluminum atom. In the solution of the aluminoxane, concentration of the aluminoxane is generally 0.1 to 3 gram atoms/liter, and preferably 0.2 to 2 gram atoms/liter calculated as aluminum atom. In the reaction of said treatment, the organometallic compound is employed generally from 0.01 to 5 gram atoms, and preferably from 0.05 to 3 gram atoms calculated as organometallic atom per 100 g of the fine-particle carrier, and the aluminoxane is employed generally from 0.05 to 10 gram atoms, and preferably from 0.1 to 5 gram atoms calculated as aluminum atom per 100 g of the fine-particle carrier. In these processes, the temperature of the reaction system is generally from $-50°$ C. to $110°$ C., and preferably from $0°$ C. to $80°$ C. in the case of treating with the solution of the organometallic compound; generally from $-50°$ C. to $110°$ C., and preferably from $0°$ C. to $90°$ C. in the case of treating with the solution of a mixture of the organometallic compound and the aluminoxane; and generally from $-50°$ C. to $110°$ C., and preferably from $0°$ C. to $90°$ C. in the case of treating with the aluminoxane solution. In any of these processes, the time required for the treatment is generally from 1 minute to 2 hours.

In any of these processes, said contact treatments are carried out with the fine-particle carriers suspended in an inert solvent. For example, the fine-particle carrier may be suspended in the inert solvent, the contact treatment may then be effected by adding the solution of the organometallic compound, the solution of a mixture of the organometallic compound and the aluminoxane, or the aluminoxane solution into the suspension.

In the above-described treatments, the proportion of the organometallic compound and the aluminoxane supported on the fine-particle carrier may be selected depending on the above-specified treating conditions such that the final olefin-polymerizing solid catalyst of the present invention may comprise the catalyst components at predetermined contents.

In the above-described treatments, the solution of the organometallic compound, the solution of a mixture of the organometallic compound and the aluminoxane, and the aluminoxane solution may typically comprise a solvent, for example, an aliphatic hydrocarbon such as pentane, hexane, heptane, octane, decane, dodecane, keroseine, gas oil, etc.; an alicyclic hydrocarbon such as cyclohexane, cyclooctane, cyclodecane, etc.; and an aromatic hydrocarbon such as benzene, toluene, ethylbenzene, xylene, cumene, etc.

In treating the fine-particle carrier by the aluminoxane by such a process as above-described (1), (2) and (3) for the preparation of the olefin-polymerizing solid catalyst of the present invention, the aluminoxane supported on the fine-particle carrier may preferably be an aluminoxane precipitated by contacting the aluminoxane solution with a solvent to which the aluminoxane is insoluble or hardly soluble in order to obtain an olefin-polymerizing solid catalyst having a superior polymerization activity. Illustrative aluminoxane treatments of the fine-particle carrier include the processes (4), (5), (6), and (7) as described below.

(4) An aluminoxane-supported fine-particle carrier may be prepared by preparing a suspension of the fine-particle carrier or the fine-particle carrier pretreated with the organoaluminum compound dispersed in a solvent used for dissolving aluminoxane, contacting the aluminoxane or the alumonoxane solution with said suspension, and contacting said suspension with a solvent to which the aluminoxane is either insoluble or hardly soluble.

Specifically, the aluminoxane-supported fine-particle carrier may be prepared by preparing a suspension comprising the solvent used for dissolving the aluminoxane and the fine-particle carrier or the fine-particle carrier pretreated with the organometallic compound; contacting said suspension with the aluminoxane or the aluminoxane solution to generate a suspension containing both the aluminoxane and the fine-particle carrier; and adding the solvent to which the aluminoxane is either insoluble or hardly soluble to said suspension to precipitate the aluminoxane onto the fine-particle carrier. The aluminoxane may also be precipitated by adding said suspension containing both the aluminoxane and the fine-particle carrier to the solvent to which the aluminoxane is either insoluble or hardly soluble. The aluminoxane precipitation may further be promoted by evaporating off the solvent capable of dissolving the aluminoxane from said mixed suspension.

The proportion of the solvent to which the aluminoxane is either insoluble or hardly soluble may generally be in the range of from 10 to 10,000 parts by weight, and preferably from 100 to 1,000 parts by weight based on 100 parts by weight of the aluminoxane-dissolving solvent present in the suspension of the fine-particle carrier into the aluminoxane-dissolving solvent. The contact treatment is generally carried out with agitation at a temperature of from $-50°$ C. to $110°$ C., preferably from $0°$ C. to $90°$ C., and more preferably from $0°$ C. to $80°$ C.

The aluminoxane solution is prepared at least from the aluminoxane and the solvent capable of dissolving the aluminoxane which will be exemplified later. The aluminoxane solution may be obtained by simply mixing both compounds, or by mixing both compounds under heating. The solvent included in the aluminoxane solution may generally be from 0.1 to 50 liters, preferably from 0.2 to 10 liters, and more preferably from 0.3 to 2 liters per 1 gram atom of aluminum in the aluminoxane.

(5) An aluminoxane-supported fine-particle carrier may also be prepared by preparing a suspension of the fine-particle carrier or the fine-particle carrier pretreated with the organoaluminum compound dispersed in the aluminoxane solution, and contacting the suspension with the solvent to which the aluminoxane is either insoluble or hardly soluble.

Specifically, the aluminoxane-supported fine-particle carrier may be prepared by preparing a suspension comprising the aluminoxane solution and the fine-particle carrier or the fine-particle carrier pretreated with the organoaluminum compound; and adding the solvent to which the aluminoxane is either insoluble or hardly soluble to the suspension to precipitate the aluminoxane onto the fine-particle carrier. The aluminoxane may also be precipitated by adding said suspension comprising the aluminoxane solution and the carrier to the solvent to which the aluminoxane is either insoluble or hardly soluble. The aluminoxane precipitation may further be promoted by evaporating off the solvent used for dissolving the aluminoxane from said mixed suspension.

In the above-described treatment, the proportion of the solvent to which the aluminoxane is either insoluble or hardly soluble may generally be in the range of from 10 to 10,000 parts by weight, and preferably from 100 to 1,000 parts by weight based on 100 parts by weight of the aluminoxane solution. The contact treatment is generally carried out with agitation at a temperature of from $-50°$ C. to $110°$ C., preferably from $0°$ C. to $90°$ C., and more preferably from $0°$ C. to $80°$ C.

(6) An aluminoxane-supported fine-particle carrier may be prepared by preparing a suspension of the fine-particle carrier or the fine-particle carrier pretreated with the organoaluminum compound dispersed in the solvent to which the aluminoxane is either insoluble or hardly soluble, and contacting the aluminoxane solution with the suspension.

Specifically, the aluminoxane-supported fine-particle carrier may be prepared by preparing a suspension of the fine-particle carrier or the fine-particle carrier pretreated with the organoaluminum compound dispersed in the solvent to which the aluminoxane is either insoluble or hardly soluble, and adding the aluminoxane solution to the suspension to precipitate the aluminoxane onto the fine-particle carrier. The aluminoxane may also be precipitated by adding said suspension comprising the solvent to which the aluminoxane is either insoluble or hardly soluble and the fine-particle carrier to the aluminoxane solution. The aluminoxane precipitation may further be promoted by evaporating off the solvent used for dissolving the aluminoxane from said mixed suspension.

The suspension and the aluminoxane solution may generally be contacted with agitation at a temperature of from −50° C. to 110° C., preferably from 0° C. to 90° C., and more preferably from 0° C. to 80° C. The proportion of the aluminoxane solution may generally be in the range of from 1 to 1,000 parts by weight, and preferably from 10 to 100 parts by weight based on 100 parts by weight of the suspension.

The aluminoxane solution is prepared at least from the aluminoxane and the solvent capable of dissolving the aluminoxane which will be exemplified later. The aluminoxane solution may be obtained by simply mixing both compounds, or by mixing both compounds under heating. The solvent included in the aluminoxane solution may generally be from 0.1 to 50 liters, preferably from 0.2 to 10 liters, and more preferably from 0.3 to 2 liters per 1 gram atom of aluminum in the aluminoxane.

(7) A solid component for olefin-polymerizing catalyst may be prepared by preparing a suspension of the fine-particle carrier or the fine-particle carrier pretreated with the organoaluminum compound dispersed in the solution of the aluminoxane and the group IVB transition metal compound, and contacting said suspension with the solvent to which the aluminoxane is either insoluble or hardly soluble.

Specifically, the aluminoxane-supported fine-particle carrier for the olefin-polymerizing solid catalyst may be prepared by preparing a suspension containing the aluminoxane, the transition metal compound, and the fine-particle carrier or the fine-particle carrier pretreated with the organometallic compound; and contacting the solvent to which the aluminoxane is either insoluble or hardly soluble with the suspension to precipitate the aluminoxane onto the fine-particle carrier. The aluminoxane may also be precipitated onto the fine-particle carrier by adding said suspension containing the aluminoxane, the transition metal compound, and the fine-particle carrier or the fine-particle carrier pretreated with the organometallic compound to the solvent to which the aluminoxane is either insoluble or hardly soluble. The aluminoxane precipitation may further be promoted by evaporating off the solvent used for dissolving the aluminoxane from said mixed suspension.

In the above-described treatment, the proportion of the solvent to which the aluminoxane is either insoluble or hardly soluble may generally be in the range of from 10 to 10,000 parts by weight, and preferably from 100 to 1,000 parts by weight based on 100 parts by weight of the solution of the aluminoxane and the group IVB transition metal compound. The contact treatment is generally carried out with agitation at a temperature of from −50° C. to 110° C., preferably from 0° C. to 90° C., and more preferably from 0° C. to 80° C.

The solution of the aluminoxane and the transition metal compound is prepared at least from the aluminoxane, the transition metal compound, and the solvent capable of dissolving the aluminoxane which will be exemplified later. The solution may be obtained by simply mixing these compounds, or by mixing these compounds under heating. The solvent included in the solution may generally be from 0.1 to 50 liters, preferably from 0.2 to 10 liters, and more preferably from 0.3 to 2 liters per 1 gram atom of aluminum in the aluminoxane.

The solvents which are capable of dissolving the aluminoxane include, aromatic hydrocarbons such as benzene, toluene, ethylbenzene, propylbenzene, butylbenzene, xylene, chlorobenzene, etc. The solvents to which the aluminoxane is either insoluble or hardly soluble include linear and branched aliphatic hydrocarbons such as pentane, hexane, decane, dodecane, kerosin, etc., and alicyclic hydrocarbons such as cyclohexane, norbornane, ethylcyclohexane, etc. The solvent to which the aluminoxane is either insoluble or hardly soluble may preferably have a higher boiling point than the solvent used for dissolving the aluminoxane.

The olefin-polymerizing solid catalyst of the present invention is prepared by subjecting the fine-particle carrier treated with the organometallic compound and the aluminoxane according to such a process as above-mentioned (4), (5) or (6) to a contact treatment with the group IVB transition metal and the preliminary polymerization. When the fine-particle carrier is treated according to the process (7), an additional transition metal may or may not be added to the reaction system. For example, the olefin-polymerizing solid catalyst of the present invention may be prepared by contacting the suspension of the fine-particle carrier treated with the organometallic compound and the aluminoxane with the group IVB transition metal compound, and then introducing the olefin into the suspension for the preliminary polymerization. The transition metal compound is supported on the carrier by the preliminary polymerization.

In contacting the fine-particle carrier treated with the organometallic compound and the aluminoxane with the transition metal compounds, the amount of the transition metal compound used may range from $2 \times 10^{-4}$ to $5 \times 10^{-2}$ gram atoms, and preferably $1 \times 10^{-3}$ to $1 \times 10^{-2}$ gram atoms per 100 g of the fine-particle carrier. The temperature during the contact treatment may generally be from −50° C. to 150° C., and preferably from 0° to 100° C.

The preliminary polymerization is carried out in an inert hydrocarbon medium. In the preliminary polymerization treatment, concentration of the transition metal compound is generally $1 \times 10^{-4}$ to $5 \times 10^{-2}$ gram atoms/liter, and preferably $5 \times 10^{-4}$ to $1 \times 10^{-2}$ gram atoms/liter. The inert hydrocarbon medium used for the preliminary polymerization may typically be the solvents constituting said solution of the organometallic compound or the aluminoxane. Among these solvents, aliphatic hydrocarbons such as hexane, heptane, octane and decane, and alicyclic solvents such as cyclohexane and cyclooctane are preferred.

The preliminary polymerization may generally be carried out at a temperature of from −20° C. to 70° C., preferably from −10° C. to 60° C., and most preferably from 0° C. to 50° C.

The olefin-polymerizing solid catalyst of the present invention may be obtained by removing solvent-soluble catalyst components by a filtration or decantation after the preliminary polymerization.

The amounts of the catalyst components such as the transition metal compound, the organometallic compound, the aluminoxane, and the olefin polymer produced by the preliminary polymerization supported on the fine-particle carrier in the preparation of the olefin-polymerizing catalyst of the present invention are selected depending on the above-specified preparation conditions such that the contents of each of the catalyst components in the final olefin-polymerizing catalyst would be within the predetermined ranges.

The catalyst of the present invention is effective for producing an olefin polymer, particularly, ethylene polymer and an ethylene-α-olefin copolymer. Examples of the olefins which can be polymerized by the catalyst of the present invention include $C_{2-20}$ α-olefins, such as ethylene, propylene, 1-butene, 1-hexene, 4-methyl-1-pentene, 1-octene, 1-decene, 1-dodecene, 1-tetradecene, 1-hexadecene, 1-octadecene, 1-eicocene, etc. Among these, the catalyst of the present invention is suitable for polymerizing ethylene, or copolymerizing a $C_{3-10}$ α-olefin.

In an olefin polymerization employing the catalysts according to the present invention, olefins are polymerized by a gas-phase polymerization or a slurry polymerization. In the slurry polymerization, either an inert hydrocarbon or the olefin itself may be used as a solvent.

Illustrative hydrocarbon media are aliphatic hydrocarbons such as butane, isobutane, pentane, hexane, octane, decane, dodecane, hexadecane, octadecane, etc.; alicyclic hydrocarbons such as cyclopentane, methylcyclopentane, cyclohexane, cyclooctane, etc.; and petroleum cuts such as kerosine, gas oil, etc.

The slurry polymerization utilizing the catalyst of the present invention may generally be carried out at a temperature in the range of from $-50°$ C. to $120°$ C., and preferably from $0°$ C. to $100°$ C.

The gas-phase polymerization utilizing the catalyst of the present invention may generally be carried out at a temperature in the range of from $0°$ C. to $120°$ C., and preferably from $20°$ C. to $100°$ C.

The amount of the transition metal compound used in the slurry polymerization or the gas-phase polymerization utilizing the catalyst of the present invention may generally be in the range of $10^{-8}$ to $10^{-2}$ gram atoms/liter, and preferably $10^{-7}$ to $10^{-3}$ gram atoms/liter as a concentration of the transition metal atom in the polymerization system.

An additional aluminoxane or organoaluminum compound having a general formula: $R^h{}_pR^i{}_qAlX_{3-p-q}$ may optionally be employed in the practice of the above-described olefin polymerization. $R^h$ is a $C_{1-10}$ hydrocarbon, preferably a $C_{1-6}$ alkyl, alkenyl, cycloalkyl, or aryl radical, $R^i$ is a $C_{1-6}$ alkoxy, or aryloxy radical, X is a halogen atom, p is $3 \geq p > 0$, and q is $2 \geq q \geq 0$. An addition of an organoaluminum compound having a branched radical such as triisobutylaluminum and isoprenylaluminum is particularly effective for improving the polymerization activity.

The olefin polymerization may generally be carried out under a pressure of standard pressure to 100 kg/cm², and preferably from 2 to 50 kg/cm². The polymerization may be carried out by a batch method, semi-continuous method, or continuous method.

Further, the polymerization may be carried out in two or more steps corresponding to different reaction conditions.

When the slurry polymerization or the gas-phase polymerization, particularly, the gas-phase polymerization is carried out for polymerizing an olefin, particularly for polymerizing ethylene or copolymerizing ethylene and an α-olefin by using the olefin-polymerizing solid catalyst of the present invention, the resulting polymer does not deposit on the reactor wall. Moreover, the resulting polymer has excellent powder properties and narrow molecular-weight distribution. In the case of copolymerizing two or more olefins, the resulting polymer has both narrow molecular-weight distribution and composition distribution. Even when a significantly smaller amount of aluminoxane compared to conventional processes is used, the catalyst may still be able to produce high-molecular weight polymers with high activity.

In order that those skilled in the art will be better able to practice the present invention, the following examples are given by way of illustration and not by way of limitation.

In the Examples and Comparative Examples, the melt flow rate (MFR) is measured at a temperature of $190°$ C. and under a load of 2.16 kg, and the value of $\overline{M}w/\overline{M}n$ is measured as described hereinafter according to the process described in Takeuchi et al., "Gel Permeation Chromatography", Maruzen K. K., Tokyo, 1976.

(1) Using a polystyrene having a known molecular weight (a monodisperse polystyrene manufactured by Toyo Soda Mfg. K. K.) as a standard, a molecular weight M and gel permeation chromatograph (GPC) counts are measured to plot a calibration curve between the molecular weight M and the elution volume (EV). The concentration at this stage is 0.02% by weight.

(2) A GPC chromatogram of the sample was depicted by measuring on GPC. The number average molecular weight $\overline{M}n$ and the weight average molecular weight $\overline{M}w$ calculated as polystyrene are determined from the calibration curve plotted in (1) to find out the value of $\overline{M}w/\overline{M}n$. Samples were prepared and measured on GPC as described below.

Sample preparation (a) The sample and o-dichlorobenzene solvent are added to an Erlenmeyer flask so that the concentration of the sample is 0.1% by weight.
(b) The Erlenmeyer flask is heated to $140°$ C. and agitated for 30 minutes to dissolve the sample.
(c) The solution is applied to GPC.

Measurement on GPC

The following conditions were used.
(a) equipment: 150C-ALC/GPC manufactured by Waters Co.
(b) column: GMH type manufactured by Toyo Soda Mfg. K. K.)
(c) Sample volume: 400 μl
(d) temperature: $140°$ C.
(e) flow rate: 1 ml/min.

The amount of n-decane-soluble portion in the copolymer was measured by adding about 3 g of the copolymer into 450 ml of n-decane, dissolving the copolymer at $145°$ C., gradually cooling the solution to $23°$ C., removing n-decane-insoluble portion by filtering the solution, and recovering the n-decane-soluble portion from the filtrate. The amount of the n-decane-soluble portion is indicative of the composition distribution, and a smaller soluble portion indicates a narrower composition distribution.

EXAMPLE 1

Preparation of aluminoxane

A 400 ml flask was fully purged with nitrogen and charged with 37 g of $Al_2(SO_4)_3 \cdot 14H_2O$ and 125 ml of toluene, and cooled to $0°$ C. To this solution, 500 mmol of trimethylaluminum diluted with 125 ml of toluene was added dropwise. The solution was then heated to $35°$ C., and reacted at this temperature for 10 hours. After the reaction, solid was removed by filtration, and toluene was removed from the filtrate. 11 g of white solid aluminoxane was obtained. The molecular weight determined by cryoscopy in benzene was 810, and the value of m in formulae [I] and [II] was 12.

Preparation of solid catalyst (zirconium catalyst)

A 100 ml flask was fully purged with nitrogen, and charged with 2.7 g of silica (F-952 manufactured by Fuji Devison K. K.) which had been calcined at 700° C. for 6 hours and 15 ml of toluene to produce a suspension. To the suspension, 13.5 ml of toluene solution of triisobutylaluminum (Al, 1 mol/l) was added, and agitated at 23° C. for 30 minutes. Subsequently, 18 ml of toluene solution of the aluminoxane (Al, 1.25 mol/l) was added and agitated at 23° C. for another 10 minutes. To this solution, 30 ml of n-decane was added, and toluene was removed at a temperature of 50° C. and at a reduced pressure of 2 mmHg. The removal of toluene required 85 minutes. To the thus obtained fine-particle solid suspended in n-decane, 4.5 ml of toluene solution of bis(cyclopentadienyl)zirconium dichloride (Zr, 0.04 mol/l) was added, and toluene was again removed at a temperature of 50° C. and at a reduced pressure of 2 mmHg. The toluene removal required 45 minutes. To said suspension, an additional 100 ml n-decane was added, and ethylene gas at atmospheric pressure was continuously introduced thereto to effect a preliminary polymerization at 35° C. for 2 hours. Subsequently, n-decane was removed by filtration, and the reaction mixture was washed three times with hexane at 60° C. As a result of such a procedure, a catalyst containing $5.0 \times 10^{-3}$ gram atoms of Zr, 0.55 gram atoms of Al, and 280 g of polyethylene per 100 g of silica was obtained.

Polymerization

A stainless autoclave having an internal volume of 2 liters was fully purged with nitrogen and charged with 250 g of sodium chloride (special grade, manufactured by Wako Pharmaceutical K. K.), which was then dried at a temperature of 90° C. at a reduced pressure for 1 hour. The reaction system was cooled to 75° C., and 0.015 mg atom calculated as zirconium atom of said solid catalyst was added. 50 ml of hydrogen was introduced, ethylene was introduced at 75° C. to start polymerization, and a total pressure was set at 8 kg/cm$^2$-G. The polymerization was continued at 80° C. for 1 hour while the total pressure was kept at 8 kg/cm$^2$ by feeding ethylene. After completion of the polymerization, sodium chloride was removed by washing with water, and the remaining polymer was washed with hexane and dried at a temperature of 80° C. and at a reduced pressure for overnight.

There was obtained 154 g of a spherical polymer having MFR of 0.08 g/10 min, $\overline{Mw}/\overline{Mn}$ of 2.61, and bulk density of 0.38 g/cm$^3$. The polymer had an average particle diameter of 280μ. Deposition of the polymer onto the autoclave wall was not recognized.

EXAMPLES 2 TO 11, 14, AND 15

The procedure of Example 1 was repeated except that the zirconium catalysts were prepared under the conditions as specified in Table 1.

Polymerization was carried out in an exactly the same manner as Example 1. The results are shown in Table 2.

EXAMPLE 12

The procedure of Example 1 was repeated except that a mixed gas of ethylene and propylene (propylene, 3 mol %) was employed and the catalyst was prepared under the conditions as specified in Table 1.

Polymerization was carried out in a similar manner as Example 1 except for that 0.01 mg atom calculated as zirconium atom of the solid catalyst was employed.

The results are shown in Tables 1 and 2.

EXAMPLE 13

To 17 ml toluene solution of bis(cyclopentadienyl)ethoxyzirconium monochloride (Zr, 0.02 mol/l), 0.4 ml of decane solution of ethylaluminum dichloride (Al, 1.0 mol/l) was added and reacted at 23° C. for 30 minutes.

Catalyst preparation and polymerization were carried out in a similar manner as Example 2 except that all of the zirconium solution as prepared above was added instead of bis(cyclopentadienyl)zirconium dichloride. The results are shown in Tables 1 and 2.

EXAMPLE 16

The procedure of Example 2 was repeated except that 10 ml of 1-hexene was added, 0.01 mg atom calculated as zirconium atom of catalyst was employed, and polymerization was carried out for 30 minutes without adding hydrogen. There was obtained 60 g of a spherical polymer having MFR of 0.58 g/10 min., $\overline{Mw}/\overline{Mn}$ of 2.49, bulk density of 0.35 g/cm$^3$, density of 0.931 g/cm$^3$, and content of the decane-soluble portion at room temperature of 0.11% by weight. The polymer had an average particle diameter of 230μ. Deposition of the polymer onto the autoclave wall was not recognized.

EXAMPLE 17

The catalyst preparation procedure of Example 2 was repeated except that silica (Microbeads manufactured by Fuji Devison K. K., specific surface area, 73 m$^2$/g, particle diameter, 30 to 70μ) was employed as a fine-particle carrier. The resulting catalyst had $3.7 \times 10^{-3}$ gram atom of Zr, 0.40 gram atom of Al, and 350 g of polyethylene per 100 g of silica.

Polymerization was carried out in an exactly same manner as Example 2 by using the thus prepared catalyst. There was obtained 101 g of spherical polymer having MFR of 0.13 g/10 min., $\overline{Mw}/\overline{Mn}$ of 2.52, and bulk density of 0.45 g/cm$^3$ and particle diameter of 320 μm.

Deposition of the polymer onto the autoclave wall was not recognized.

EXAMPLE 18

The catalyst preparation procedure of Example 2 was repeated except that (isobutyl)$_2$Al-O-Al(isobuthyl)$_2$ was employed instead of (isobutyl)$_3$Al. The resulting catalyst contained $3.9 \times 10^{-3}$ gram atom of Zr, 0.58 gram atom of Al, and 170 g of polyethylene.

Polymerization was carried out in an exactly same manner as Example 2 by using the thus prepared catalyst. There was obtained 110 g of a polymer having MFR of 0.06 g/10 min., $\overline{Mw}/\overline{Mn}$ of 2.64, and bulk density of 0.28 g/cm$^3$.

Deposition of the polymer onto the autoclave wall was not recognized.

EXAMPLE 19

Preparation of solid catalyst (zirconium catalyst)

A 100 ml flask was fully purged with nitrogen, and charged with 3.0 g of silica used in Example 1 and 15 ml of n-decane to produce a suspension. To the suspension, 10 ml of decane solution of triisobutylaluminum (Al, 1 mol/l) was added, and agitated at 23° C. for 30 minutes.

Subsequently, 21 ml of the aluminoxane suspension in decane (Al, 1.2 mol/l) was added and agitated at 23° C. for another 10 minutes. 5 ml toluene solution of bis(cyclopentadienyl)zirconium dichloride (Zr, 0.04 mol/l) was added, and toluene was removed at a temperature of 50° C. and at a reduced pressure of 2 mmHg. The toluene removal required 30 minutes. To said suspension, an additional 100 ml n-decane was added, and ethylene gas at atmospheric pressure was continuously introduced thereto to effect a preliminary polymerization at 35° C. for 2 hours. The procedure of Example 1 was subsequently repeated, and a catalyst containing $3.4 \times 10^{-3}$ gram atoms of Zr, 0.35 gram atoms of Al, and 650 g of polyethylene per 100 g of silica was obtained.

Polymerization

The procedure of Example 1 was exactly repeated. There was obtained 134 g of a spherical polymer having MFR of 0.10 g/10 min., $\overline{Mw}/\overline{Mn}$ of 2.66, and bulk density of 0.40 g/cm$^3$. The polymer had an average particle diameter of 330μ.

Deposition of the polymer onto the autoclave wall was not recognized.

COMPARATIVE EXAMPLE 1

Preparation of solid catalyst (zirconium catalyst)

The procedure of Example 15 was repeated except that triisobutylaluminum was not used. There was obtained a catalyst containing $6.7 \times 10^{-3}$ gram atoms of Zr, 0.32 gram atoms of Al, and 15 g of polyethylene per 100 g of silica.

Polymerization

The procedure of Example 15 was exactly repeated. The polymer obtained was only 3 g.

COMPARATIVE EXAMPLE 2

The procedure of Example 2 was repeated except that no aluminoxane was used in the procedure of the preparation of solid catalyst. The resulting catalyst did not exhibit any polymerization activity.

TABLE 1

| Example No. | SiO$_2$ Amount, g | (isoBu)$_3$Al Amount, mmol | Reaction temp, °C. | Reaction time, min. | Aluminoxane Amount, mmol | Reaction temp, °C. | Reaction time, min. | Substitution of solvent Amount of decane used, ml | temp, °C. | time, min. |
|---|---|---|---|---|---|---|---|---|---|---|
| 1 | 2.7 | 13.5 | 23 | 30 | 22.5 | 23 | 10 | 30 | 50 | 85 |
| 2 | 3.0 | 10.0 | 23 | 30 | 25.0 | 23 | 10 | 30 | 50 | 95 |
| 3 | 3.2 | 5.3 | 23 | 30 | 26.5 | 23 | 10 | 30 | 50 | 80 |
| 4 | 2.8 | 14.0 | 23 | 30 | 23.3 | 23 | 10 | 30 | 50 | 85 |
| 5* | 3.4 | 23.0 | 23 | 30 | 29.0 | 23 | 10 | 30 | 50 | 70 |
| 6 | 2.8 | 9.3 | 23 | 30 | 15.5 | 23 | 10 | 30 | 50 | 80 |
| 7 | 3.1 | 10.0 | 23 | 30 | 40.0 | 23 | 10 | 30 | 50 | 80 |
| 8 | 2.7 | 9.0 | 60 | 60 | 22.5 | 23 | 10 | 30 | 50 | 45 |
| 9 | 2.9 | 10.0 | 23 | 30 | 25.0 | 80 | 90 | 30 | 50 | 100 |
| 10 | 2.9 | 9.5 | 23 | 30 | 24.0 | 23 | 10 | 30 | 80 | 90 |
| 11 | 1.9 | 6.3 | 23 | 30 | 16.0 | 23 | 10 | 30 | 80 | 30 |
| 12 | 3.0 | 10.0 | 23 | 30 | 49.5 | 23 | 10 | 40 | 50 | 90 |
| 13** | 3.0 | 10.0 | 23 | 30 | 25.0 | 23 | 10 | 30 | 50 | 95 |
| 14*** | 3.0 | 7.5 | 23 | 30 | 25.0 | 23 | 60 | 30 | 50 | 40 |
| 15*** | 3.0 | 7.5 | 23 | 30 | 15.0 | 23 | 60 | 30 | 50 | 45 |

| Example No. | Cp$_2$ZrCl$_2$ Amount, mmol | Toluene removal Temp, °C. | time, min. | Composition of catalyst* Zr, mg atom | Al, g atom | Prepolymerized polyethylene, g |
|---|---|---|---|---|---|---|
| 1 | 0.18 | 50 | 45 | 5.0 | 0.55 | 280 |
| 2 | 0.20 | 50 | 45 | 3.3 | 0.32 | 680 |
| 3 | 0.21 | 50 | 30 | 8.0 | 0.70 | 570 |
| 4 | 0.19 | 50 | 45 | 3.8 | 0.40 | 320 |
| 5* | 0.23 | 50 | 30 | 3.2 | 0.21 | 190 |
| 6 | 0.19 | 50 | 20 | 4.0 | 0.31 | 380 |
| 7 | 0.20 | 50 | 45 | 4.2 | 0.55 | 340 |
| 8 | 0.18 | 50 | 45 | 4.0 | 0.38 | 350 |
| 9 | 0.20 | 50 | 45 | 3.7 | 0.35 | 370 |
| 10 | 0.19 | 50 | 45 | 3.7 | 0.38 | 380 |
| 11 | 0.13 | 50 | 30 | 5.5 | 0.57 | 1100 |
| 12 | 0.35 | 50 | 40 | 5.5 | 0.50 | 290 |
| 13** | 0.20 | 50 | 45 | 3.0 | 0.30 | 230 |
| 14*** | 0.40 | — | — | 7.8 | 0.37 | 520 |
| 15*** | 0.30 | — | — | 6.4 | 0.39 | 620 |

*Loading weight per 100 g SiO$_2$.
**Cp$_2$ZrEtOCl was used instead of Cp$_2$ZrCl$_2$.
***Toluene was not removed.

TABLE 2

| Example | Yield, g | MFR, g/10 min. | $\overline{Mw}/\overline{Mn}$ | Bulk density, g/cm$^3$ | Average particle diameter, μ |
|---|---|---|---|---|---|
| 1 | 154 | 0.08 | 2.61 | 0.38 | 280 |
| 2 | 128 | 0.09 | 2.58 | 0.40 | 320 |
| 3 | 97 | 0.11 | 2.69 | 0.38 | 220 |
| 4 | 118 | 0.06 | 2.73 | 0.42 | 270 |
| 5 | 106 | 0.10 | 2.55 | 0.41 | 190 |
| 6 | 105 | 0.07 | 2.60 | 0.39 | 250 |
| 7 | 167 | 0.10 | 2.53 | 0.40 | 290 |
| 8 | 116 | 0.03 | 2.67 | 0.41 | 250 |
| 9 | 120 | 0.05 | 2.59 | 0.38 | 280 |
| 10 | 131 | 0.03 | 2.60 | 0.37 | 280 |
| 11 | 128 | 0.06 | 2.66 | 0.39 | 310 |
| 12 | 100 | 0.12 | 2.78 | 0.39 | 300 |
| 13 | 118 | 0.13 | 2.80 | 0.37 | 270 |
| 14 | 107 | 0.09 | 2.64 | 0.40 | 290 |
| 15 | 94 | 0.08 | 2.69 | 0.40 | 280 |

We claim:

1. A solid catalyst for polymerizing an olefin or copolymerizing olefins produced by the process comprising contacting an α-olefin with a mixture obtained by mixing an organoaluminum compound having a branched alkyl radical, an aluminoxane, with the proviso that a ratio of the aluminum content in the aluminoxane to the aluminum content in the organoaluminum compound is in the range of 1.25 to 5.0, a fine-particle carrier, and a transition metal compound, represented by the formula (III):

$$R^1{}_k R^2{}_l R^3{}_m R^4{}_n M \qquad \text{(III)}$$

to pre-polymerize the α-olefin and produce said solid catalyst;

wherein M is selected from the group consisting of titanium, zirconium, and hafnium; $R^1$ is a cyclopentadienyl radical optionally substituted with at least one $C_{1-4}$ hydrocarbon; $R^2$, $R^3$ and $R^4$ are independently selected from the group consisting of a cyclopentadienyl radical optionally substituted with at least one $C_{1-4}$ hydrocarbon, an aryl, an alkyl, a cycloalkyl, an aralkyl, a halogen, hydrogen, $OR^a$, $SR^b$, $NR^c{}_2$ and $PR^d{}_2$, wherein $R^a$, $R^b$, $R^c$ and $R^d$ are independently a hydrocarbon radical selected from the group consisting of an alkyl, a cycloalkyl, an aryl and an aralkyl or silyl, with the proviso that $R^c$ and $R^d$ may, taken together, form a ring; k is at least 1; and the sum of k, l, m, and n equals 4; and wherein $R^1$ and $R^2$ may be bonded by an intervening lower alkylene radical when $R^2$ is a cyclopentadienyl radical optionally substituted with at least one $C_{1-4}$ hydrocarbon.

2. The solid catalyst according to claim 1, wherein M is zirconium.

3. The solid catalyst according to claim 1 wherein the α-olefin is contacted with the mixture in the presence of a hydrocarbon solvent.

4. The solid catalyst according to claim 1 wherein the fine-particle carrier comprises an inorganic oxide having an average particle diameter in the range of from 1 to 300 micrometers.

5. The solid catalyst according to claim 4 wherein said oxide comprises at least an oxide selected from the group consisting of $SiO_2$, $Al_2O_3$, and MgO.

6. The solid catalyst according to claim 1 wherein the fine-particle carrier comprises an organic polymer and has an average particle diameter in the range of from 1 to 300 micrometers.

7. The solid catalyst according to claim 6 wherein said organic polymer comprises a polyolefin.

8. The solid catalyst according to claim 1 wherein said aluminoxane comprises a compound represented by the formula (I) or (II):

$$R_2Al-(O-Al)_m-O-AlR \qquad \text{(I)}$$
$$\qquad \quad \; | \qquad \qquad \; |$$
$$\qquad \quad \; R \qquad \qquad \; R$$

$$\overline{\phantom{XX}(O-Al)_{m+2}\phantom{XX}} \qquad \text{(II)}$$
$$\qquad \qquad |$$
$$\qquad \qquad R$$

wherein R is a $C_{1-20}$ hydrocarbon radical and m has a value of 2 to 50.

9. The solid catalyst according to claim 1 wherein the cyclopentadienyl radical is selected from the group consisting of cyclopentadienyl, methylcyclopentadienyl, ethylcyclopentadienyl, dimethylcyclopentadienyl, pentamethylcyclopentadienyl, indenyl, and tetrahydroindenyl radicals.

10. The solid catalyst according to claim 1 wherein the transition metal compound is selected from the group consisting of
ethylenebis(indenyl)ethoxyzirconium chloride,
ethylenebis(4,5,6,7-tetrahydro-1-indenyl)ethoxyzirconium chloride,
ethylenebis(indenyl)dimethylzirconium,
ethylenebis(indenyl)diethylzirconium,
ethylenebis(indenyl)diphenylzirconium,
ethylenebis(indenyl)dibenzylzirconium,
ethylenebis(indenyl)methylzirconium monobromide,
ethylenebis(indenyl)ethylzirconium monochloride,
ethylenebis(indenyl)benzylzirconium monochloride,
ethylenebis(indenyl)methylzirconium monochloride,
ethylenebis(indenyl)zirconium dichloride,
ethylenebis(indenyl)zirconium dibromide,
ethylenebis(4,5,6,7-tetrahydro-1-indenyl)dimethylzirconium,
ethylenebis(4,5,6,7-tetrahydro-1-indenyl)methylzirconium monochloride,
ethylenebis(4,5,6,7-tetrahydro-1-indenyl)zirconium dichloride
ethylenebis(4,5,6,7-tetrahydro-1-indenyl)zirconium dibromide,
ethylenebis(4-methyl-1-indenyl)zirconium dichloride,
ethylenebis(5-methyl-1-indenyl)zirconium dichloride,
ethylenebis(6-methyl-1-indenyl)zirconium dichloride,
ethylenebis(7-methyl-1-indenyl)zirconium dichloride,
ethylenebis(5-methoxy-1-indenyl)zirconium dichloride,
ethylenebis(2,3-dimethyl-1-indenyl)zirconium dichloride,
ethylenebis(4,7-dimethyl-1-indenyl)zirconium chloride,
ethylenebis(4,7-dimethoxy-1-indenyl)zirconium dichloride,
ethylenebis(indenyl)zirconium dimethoxide,
ethylenebis(indenyl)zirconium diethoxide,
ethylenebis(indenyl)methoxyzirconium chloride,
ethylenebis(indenyl)ethoxyzirconium chloride,
ethylenebis(indenyl)methylzirconium ethoxide,
ethylenebis(4,5,6,7-tetrahydro-1-indenyl)zirconium dimethoxide,
ethylenebis(4,5,6,7-tetrahydro-1-indenyl)zirconium ethoxide,
ethylenebis(4,5,6,7-tetrahydro-1-indenyl)methoxyzirconium chloride,
ethylenebis(4,5,6,7-tetrahydro-1-indenyl)ethoxyzirconium chloride, and
ethylenebis(4,5,6,7-tetrahydro-1-indenyl)methylzirconium ethoxide.

11. A solid catalyst for polymerizing an olefin or co-polymerizing olefins, wherein said solid catalyst is prepared by the process comprising
contacting an α-olefin with a composition obtained by mixing together an organoaluminum compound having a branched alkyl radical, an aluminoxane, with the proviso that a ratio of the aluminum content in the aluminoxane to the aluminum content in the organoaluminum compound is in the range of 1.25 to 5.0, and a fine-particle carrier, in an arbitrary order, and then adding a transition metal compound, represented by the formula (III):

$$R^1{}_k R^2{}_l R^3{}_m R^4{}_n M \qquad \text{(III)}$$

to pre-polymerize the α-olefin and produce said solid catalyst;

wherein M is selected from the group consisting of titanium, zirconium, and hafnium; $R^1$ is a cyclopentadienyl radical optionally substituted with at least one $C_{1-4}$ hydrocarbon; $R^2$, $R^3$ and $R^4$ are independently selected from the group consisting of a cyclopentadienyl radical optionally substituted with at least one $C_{1-4}$ hydrocarbon, an aryl, an alkyl, a cycloalkyl, an aralkyl, a halogen, hydrogen, $OR^a$, $SR^b$, $NR^c_2$ and $PR^d_2$, wherein $R^a$, $R^b$, $R^c$ and $R^d$ are independently a hydrocarbon radical selected from the group consisting of an alkyl, a cycloalkyl, an aryl and an aralkyl or silyl, with the proviso that $R^c R^d$ may, taken together, form a ring; k is at least 1; and the sum of k, l, m, and n equals 4; and wherein $R^1$ and $R^2$ may be bonded by an intervening lower alkylene radical when $R^2$ is a cyclopentadienyl radical optionally substituted with at least one $C_{1-4}$ hydrocarbon.

12. The solid catalyst according to claim 11 wherein the fine-particle carrier and the organoaluminum compound are mixed before the addition of the aluminoxane.

13. The solid catalyst according to claim 11 wherein M is zirconium.

14. The solid catalyst according to claim 11 wherein the α-olefin is contacted with the mixture in the presence of a hydrocarbon solvent.

15. The solid catalyst according to claim 11 wherein the fine-particle carrier comprises an inorganic oxide having an average particle diameter in the range of from 1 to 300 micrometers.

16. The solid catalyst according to claim 15 wherein said oxide comprises at least an oxide selected from the group consisting of $SiO_2$, $Al_2O_3$, and MgO.

17. The solid catalyst according to claim 11 wherein the fine-particle carrier comprises an organic polymer and has an average particle diameter in the range of from 1 to 300 micrometers.

18. The solid catalyst according to claim 17 wherein said organic polymer comprises a polyolefin.

19. The solid catalyst according to claim 11 wherein said aluminoxane comprises a compound represented by the formula (I) or (II):

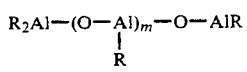  (I)

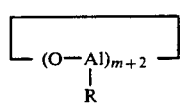  (II)

wherein R is a $C_{1-20}$ hydrocarbon radical and m has a value of 2 to 50.

20. The solid catalyst according to claim 11 wherein the cyclopentadienyl radical is selected from the group consisting of cyclopentadienyl, methylcyclopentadienyl, ethylcyclopentadienyl, dimethylcyclopentadienyl, pentamethylcyclopentadienyl, indenyl, and tetrahydroindenyl radicals.

21. The process according to claim 11 wherein the transition metal compound is selected from the group consisting of
ethylenebis(indenyl)ethoxyzirconium, chloride,
ethylenebis(4,5,6,7-tetrahydro-1-indenyl)ethoxyzirconium chloride,
ethylenebis(indenyl)dimethylzirconium,
ethylenebis(indenyl)diethylzirconium,
ethylenebis(indenyl)diphenylzirconium,
ethylenebis(indenyl)dibenzylzirconium,
ethylenebis(indenyl)methylzirconium monobromide,
ethylenebis(indenyl)ethylzirconium monochloride,
ethylenebis(indenyl)benzylzirconium monochloride,
ethylenebis(indenyl)methylzirconium monochloride,
ethylenebis(indenyl)zirconium dichloride,
ethylenebis(indenyl)zirconium dibromide,
ethylenebis(4,5,6,7-tetrahydro-1-indenyl)dimethylzirconium,
ethylenebis(4,5,6,7-tetrahydro-1-indenyl)methylzirconium monochloride,
ethylenebis(4,5,6,7-tetrahydro-1-indenyl)zirconium dichloride
ethylenebis(4,5,6,7-tetrahydro-1-indenyl)zirconium dibromide,
ethylenebis(4-methyl-1-indenyl)zirconium dichloride,
ethylenebis(5-methyl-1-indenyl)zirconium dichloride,
ethylenebis(6-methyl-1-indenyl)zirconium dichloride,
ethylenebis(7-methyl-1-indenyl)zirconium dichloride,
ethylenebis(5-methoxy-1-indenyl)zirconium dichloride,
ethylenebis(2,3-dimethyl-1-indenyl)zirconium dichloride,
ethylenebis(4,7-dimethyl-1-indenyl)zirconium dichloride,
ethylenebis(4,7-dimethoxy-1-indenyl)zirconium dichloride,
ethylenebis(indenyl)zirconium dimethoxide,
ethylenebis(indenyl)zirconium diethoxide,
ethylenebis(indenyl)methoxyzirconium chloride,
ethylenebis(indenyl)ethoxyzirconium chloride,
ethylenebis(indenyl)methylzirconium ethoxide,
ethylenebis(4,5,6,7-tetrahydro-1-indenyl)zirconium dimethoxide,
ethylenebis(4,5,6,7-tetrahydro-1-indenyl)zirconium ethoxide,
ethylenebis(4,5,6,7-tetrahydro-1-indenyl)methoxyzirconium chloride,
ethylenebis(4,5,6,7-tetrahydro-1-indenyl)ethoxyzirconium chloride, and
ethylenebis(4,5,6,7-tetrahydro-1-indenyl)methylzirconium ethoxide.

22. A process for producing a solid catalyst for polymerizing an olefin or co-polymerizing olefins produced by the process comprising contacting an α-olefin with a mixture obtained by mixing an organoaluminum compound having a branched alkyl radical, an aluminoxane, with the proviso that a ratio of the aluminum content in the aluminoxane to the aluminum content in the organoaluminum compound is in the range of 1.25 to 5.0, a fine-particle carrier, and a transition metal compound, represented by the formula (III):

  (III)

to pre-polymerize the α-olefin and produce said solid catalyst;

wherein M is selected from the group consisting of titanium, zirconium, and hafnium; $R^1$ is a cyclopentadienyl radical optionally substituted with at least one $C_{1-4}$ hydrocarbon; $R^2$, $R^3$ and $R^4$ are independently selected from the group consisting of a cyclopentadienyl radical optionally substituted with at least one $C_{1-4}$ hydrocarbon, an aryl, an alkyl, a cycloalkyl, an aralkyl, a halogen, hydrogen, $OR^a$, $SR^b$, $NR^c{}_2$ and $PR^d{}_2$, wherein $R^a$, $R^b$, $R^c$ and $R^d$ are independently a hydrocarbon radical selected from the group consisting of an alkyl, a cycloalkyl, an aryl and an aralkyl or silyl, with the proviso that $R^c$ and $R^d$ may, taken together, form a ring; k is at least 1; and the sum of k, l, m, and n equals 4; and wherein $R^1$ and $R^2$ may be bonded by an intervening lower alkylene radical when $R^2$ is a cyclopentadienyl radical optionally substituted with at least one $C_{1-4}$ hydrocarbon.

23. The process according to claim 22, wherein M is zirconium.

24. The process according to claim 22 wherein the α-olefin is contacted with the mixture in the presence of a hydrocarbon solvent.

25. The process according to claim 22 wherein the fine-particle carrier comprises an inorganic oxide having an average particle diameter in the range of from 1 to 300 micrometers.

26. The process according to claim 25 wherein said oxide comprises at least an oxide selected from the group consisting of $SiO_2$, $Al_2O_3$, and MgO.

27. The process according to claim 22 wherein the fine-particle carrier comprises an organic polymer and has an average particle diameter in the range of from 1 to 300 micrometers.

28. The process according to claim 27 wherein said organic polymer comprises a polyolefin.

29. The process according to claim 22 wherein said aluminoxane comprises a compound represented by the formula (I) or (II):

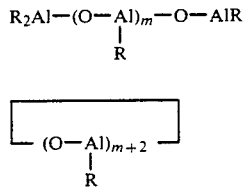

$$R_2Al-(O-Al)_m-O-AlR \qquad (I)$$
$$\phantom{R_2Al-(O-Al)_m-O-Al}R$$

$$(II)$$

wherein R is a $C_{1-20}$ hydrocarbon radical and m has a value of 2 to 50.

30. The process according to claim 22 wherein the cyclopentadienyl radical is selected from the group consisting of cyclopentadienyl, methylcyclopentadienyl, ethylcyclopentadienyl, dimethylcyclopentadienyl, pentamethylcyclopentadienyl, indenyl, and tetrahydroindenyl radicals.

31. The process according to claim 22 wherein the transition metal compound is selected from the group consisting of
ethylenebis(indenyl)ethoxyzirconium, chloride,
ethylenebis(4,5,6,7-tetrahydro-1-indenyl)ethoxyzirconium chloride,
ethylenebis(indenyl)dimethylzirconium,
ethylenebis(indenyl)diethylzirconium,
ethylenebis(indenyl)diphenylzirconium,
ethylenebis(indenyl)dibenzylzirconium,
ethylenebis(indenyl)methylzirconium monobromide,
ethylenebis(indenyl)ethylzirconium monochloride,
ethylenebis(indenyl)benzylzirconium monochloride,
ethylenebis(indenyl)methylzirconium monochloride,
ethylenebis(indenyl)zirconium dichloride,
ethylenebis(indenyl)zirconium dibromide,
ethylenebis(4,5,6,7-tetrahydro-1-indenyl)dimethylzirconium,
ethylenebis(4,5,6,7-tetrahydro-1-indenyl)methylzirconium monochloride,
ethylenebis(4,5,6,7-tetrahydro-1-indenyl)zirconium dichloride
ethylenebis(4,5,6,7-tetrahydro-1-indenyl)zirconium dibromide,
ethylenebis(4-methyl-1-indenyl)zirconium dichloride,
ethylenebis(5-methyl-1-indenyl)zirconium dichloride,
ethylenebis(6-methyl-1-indenyl)zirconium dichloride,
ethylenebis(7-methyl-1-indenyl)zirconium dichloride,
ethylenebis(5-methoxy-1-indenyl)zirconium dichloride,
ethylenebis(2,3-dimethyl-1-indenyl)zirconium dichloride,
ethylenebis(4,7-dimethyl-1-indenyl)zirconium chloride,
ethylenebis(4,7-dimethoxy-1-indenyl)zirconium dichloride,
ethylenebis(indenyl)zirconium dimethoxide,
ethylenebis(indenyl)zirconium diethoxide,
ethylenebis(indenyl)methoxyzirconium chloride,
ethylenebis(indenyl)ethoxyzirconium chloride,
ethylenebis(indenyl)methylzirconium ethoxide,
ethylenebis(4,5,6,7-tetrahydro-1-indenyl)zirconium dimethoxide,
ethylenebis(4,5,6,7-tetrahydro-1-indenyl)zirconium ethoxide,
ethylenebis(4,5,6,7-tetrahydro-1-indenyl)methoxyzirconium chloride,
ethylenebis(4,5,6,7-tetrahydro-1-indenyl)ethoxyzirconium chloride, and
ethylenebis(4,5,6,7-tetrahydro-1-indenyl)methylzirconium ethoxide.

32. A process for producing a solid catalyst for polymerizing an olefin or co-polymerizing olefins, wherein said solid catalyst is prepared by the process comprising
contacting an α-olefin with a composition obtained by mixing together an organoaluminum compound having a branched alkyl radical, an aluminoxane, with the proviso that a ratio of the aluminum content in the aluminoxane to the aluminum content in the organoaluminum compound is in the range of 1.25 to 5.0,
and a fine-particle carrier, in an arbitrary order, and then adding a transition metal compound, represented by the formula (III):

$$R^1{}_kR^2{}_lR^3{}_mR^4{}_nM \qquad (III)$$

to the mixture to pre-polymerize the α-olefin and produce said solid catalyst;
wherein M is selected from the group consisting of titanium, zirconium, and hafnium; $R^1$ is a cyclopentadienyl radical optionally substituted with at least one $C_{1-4}$ hydrocarbon; $R^2$, $R^3$ and $R^4$ are independently selected from the group consisting of a cyclopentadienyl radical optionally substituted with at least one $C_{1-4}$ hydrocarbon, an aryl, an alkyl, a cycloalkyl, an aralkyl, a halogen, hydrogen, $OR^a$, $SR^b$, $NR^c{}_2$ and $PR^d{}_2$, wherein $R^a$, $R^b$, $R^c$ and $R^d$ are independently a hydrocarbon radical selected from the group consisting of an alkyl, a cycloalkyl, an aryl and an aralkyl or silyl, with the proviso that $R^c$ and $R^d$ may, taken together, form a ring; k is at least 1; and the sum of k, l, m, and n equals 4; and wherein $R^1$ and $R^2$ may be bonded by an intervening lower alkylene radical when $R^2$ is a cyclopentadienyl radical optionally substituted with at least one $C_{1-4}$ hydrocarbon.

33. The process according to claim 32 wherein the fine-particle carrier and the organoaluminum compound are mixed before the addition of the aluminoxane.

34. The process according to claim 32 wherein M is zirconium.

35. The process according to claim 32 wherein the α-olefin is contacted with the mixture in the presence of a hydrocarbon solvent.

36. The process according to claim 32 wherein the fine-particle carrier comprises an inorganic oxide having an average particle diameter in the range of from 1 to 300 micrometers.

37. The process according to claim 36 wherein said oxide comprises at least an oxide selected from the group consisting of $SiO_2$, $Al_2O_3$, and $MgO$.

38. The process according to claim 32 wherein the fine-particle carrier comprises an organic polymer and has an average particle diameter in the range of from 1 to 300 micrometers.

39. The process according to claim 38 wherein said organic polymer comprises a polyolefin.

40. The solid catalyst according to claim 32 wherein said aluminoxane comprises a compound represented by the formula (I) or (II):

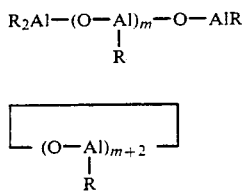

wherein R is a $C_{1-20}$ hydrocarbon radical and m has a value of 2 to 50.

41. The process according to claim 32 wherein the cyclopentadienyl radical is selected from the group consisting of cyclopentadienyl, methylcyclopentadienyl, ethylcyclopentadienyl, dimethylcyclopentadienyl, pentamethylcyclopentadienyl, indenyl, and tetrahydroindenyl radicals.

42. The process according to claim 32 wherein the transition metal compound is selected from the group consisting of
ethylenebis(indenyl)ethoxyzirconium, chloride,
ethylenebis(4,5,6,7-tetrahydro-1-indenyl)ethoxyzirconium chloride,
ethylenebis(indenyl)dimethylzirconium,
ethylenebis(indenyl)diethylzirconium,
ethylenebis(indenyl)diphenylzirconium,
ethylenebis(indenyl)dibenzylzirconium,
ethylenebis(indenyl)methylzirconium monobromide,
ethylenebis(indenyl)ethylzirconium monochloride,
ethylenebis(indenyl)benzylzirconium monochloride,
ethylenebis(indenyl)methylzirconium monochloride,
ethylenebis(indenyl)zirconium dichloride,
ethylenebis(indenyl)zirconium dibromide,
ethylenebis(4,5,6,7-tetrahydro-1-indenyl)dimethylzirconium,
ethylenebis(4,5,6,7-tetrahydro-1-indenyl)methylzirconium monochloride,
ethylenebis(4,5,6,7-tetrahydro-1-indenyl)zirconium dichloride,
ethylenebis(4,5,6,7-tetrahydro-1-indenyl)zirconium dibromide,
ethylenebis(4-methyl-1-indenyl)zirconium dichloride,
ethylenebis(5-methyl-1-indenyl)zirconium dichloride,
ethylenebis(6-methyl-1-indenyl)zirconium dichloride,
ethylenebis(7-methyl-1-indenyl)zirconium dichloride,
ethylenebis(5-methoxy-1-indenyl)zirconium dichloride,
ethylenebis(2,3-dimethyl-1-indenyl)zirconium dichloride,
ethylenebis(4,7-dimethyl-1-indenyl)zirconium dichloride,
ethylenebis(4,7-dimethoxy-1-indenyl)zirconium dichloride,
ethylenebis(indenyl)zirconium dimethoxide,
ethylenebis(indenyl)zirconium diethoxide,
ethylenebis(indenyl)methoxyzirconium chloride,
ethylenebis(indenyl)ethoxyzirconium chloride,
ethylenebis(indenyl)methylzirconium ethoxide,
ethylenebis(4,5,6,7-tetrahydro-1-indenyl)zirconium dimethoxide,
ethylenebis(4,5,6,7-tetrahydro-1-indenyl)zirconium ethoxide,
ethylenebis(4,5,6,7-tetrahydro-1-indenyl)methoxyzirconium chloride,
ethylenebis(4,5,6,7-tetrahydro-1-indenyl)ethoxyzirconium chloride, and
ethylenebis(4,5,6,7-tetrahydro-1-indenyl)methylzirconium ethoxide.

43. A solid catalyst for polymerizing an olefin or co-polymerizing olefins produced by the process comprising
contacting an α-olefin with a mixture obtained by mixing an organoaluminum compound having a branched alkyl radical, an aluminoxane,
with the proviso that a ratio of the aluminum content in the aluminoxane to the aluminum content in the organoaluminum compound is in the range of 1.25 to 5.0,
a fine-particle carrier, and a metallocene, as the only transition metal compound, represented by the formula (III):

$$R^1{}_k R^2{}_l R^3{}_m R^4{}_n M \qquad (III)$$

to pre-polymerize the α-olefin and produce said solid catalyst;
wherein M is selected from the group consisting of titanium, zirconium, and hafnium; $R^1$ is a cyclopentadienyl radical optionally substituted with at least one $C_{1-4}$ hydrocarbon; $R^2$, $R^3$ and $R^4$ are independently selected from the group consisting of a cyclopentadienyl radical optionally substituted with at least one $C_{1-4}$ hydrocarbon, an aryl, an alkyl, a cycloalkyl, an aralkyl, a halogen, hydrogen, $OR^a$, $SR^b$, $NR^c{}_2$ and $PR^d{}_2$, wherein $R^a$, $R^b$, $R^c$ and $R^d$ are independently a hydrocarbon radical selected from the group consisting of an alkyl, a cycloalkyl, an aryl and an aralkyl or silyl, with the proviso that $R^c$ and $R^d$ may, taken together, form a ring; k is at least 1; and the sum of k, l, m, and n equals 4; and wherein $R^1$ and $R^2$ may be bonded by an intervening lower alkylene radical when $R^2$ is a cyclopentadienyl radical optionally substituted with at least one $C_{1-4}$ hydrocarbon.

44. The solid catalyst according to claim 43, wherein M is zirconium.

45. The solid catalyst according to claim 43 wherein the ⇌-olefin is contacted with the mixture in the presence of a hydrocarbon solvent.

46. The solid catalyst according to claim 43 wherein the fine-particle carrier comprises an inorganic oxide having an average particle diameter in the range of from 1 to 300 micrometers.

47. The solid catalyst according to claim 46 wherein said oxide comprises at least an oxide selected from the group consisting of $SiO_2$, $Al_2O_3$, and $MgO$.

48. The solid catalyst according to claim 43 wherein the fine-particle carrier comprises an organic polymer and has an average particle diameter in the range of from 1 to 300 micrometers.

49. The solid catalyst according to claim 48 wherein said organic polymer comprises a polyolefin.

50. The solid catalyst according to claim 43 wherein said aluminoxane comprises a compound represented by the formula (I) or (II):

$$R_2Al\text{—}(O\text{—}Al)_m\text{—}O\text{—}AlR_2 \quad\quad (I)$$
$$\overset{|}{R}$$

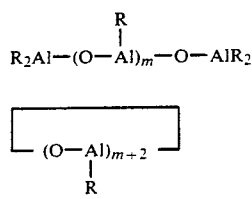

wherein R is a $C_{1-20}$ hydrocarbon radical and m has a value of 2 to 50.

51. The process according to claim 43 wherein the cyclopentadienyl radical is selected from the group consisting of cyclopentadienyl, methylcyclopentadienyl, ethylcyclopentadienyl, dimethylcyclopentadienyl, pentamethylcyclopentadienyl, indenyl, and tetrahydroindenyl radicals.

52. The solid catalyst according to claim 43 wherein the transition metal compound is selected from the group consisting of
ethylenebis(indenyl)ethoxyzirconium, chloride,
ethylenebis(4,5,6,7-tetrahydro-1-indenyl)ethoxyzirconium chloride,
ethylenebis(indenyl)dimethylzirconium,
ethylenebis(indenyl)diethylzirconium,
ethylenebis(indenyl)diphenylzirconium,
ethylenebis(indenyl)dibenzylzirconium,
ethylenebis(indenyl)methylzirconium monobromide,
ethylenebis(indenyl)ethylzirconium monochloride,
ethylenebis(indenyl)benzylzirconium monochloride,
ethylenebis(indenyl)methylzirconium monochloride,
ethylenebis(indenyl)zirconium dichloride,
ethylenebis(indenyl)zirconium dibromide,
ethylenebis(4,5,6,7-tetrahydro-1-indenyl)dimethylzirconium
ethylenebis(4,5,6,7-tetrahydro-1-indenyl)methylzirconium monochloride,
ethylenebis(4,5,6,7-tetrahydro-1-indenyl)zirconium dichloride
ethylenebis(4,5,6,7-tetrahydro-1-indenyl)zirconium dibromide,
ethylenebis(4-methyl-1-indenyl)zirconium dichloride,
ethylenebis(5-methyl-1-indenyl)zirconium dichloride,
ethylenebis(6-methyl-1-indenyl)zirconium dichloride,
ethylenebis(7-methyl-1-indenyl)zirconium dichloride,
ethylenebis(5-methoxy-1-indenyl)zirconium dichloride,
ethylenebis(2,3-dimethyl-1-indenyl)zirconium dichloride,
ethylenebis(4,7-dimethyl-1-indenyl)zirconium dichloride,
ethylenebis(4,7-dimethoxy-1-indenyl)zirconium dichloride,
ethylenebis(indenyl)zirconium dimethoxide,
ethylenebis(indenyl)zirconium diethoxide,
ethylenebis(indenyl)methoxyzirconium chloride,
ethylenebis(indenyl)ethoxyzirconium chloride,
ethylenebis(indenyl)methylzirconium ethoxide,
ethylenebis(4,5,6,7-tetrahydro-1-indenyl)zirconium dimethoxide,
ethylenebis(4,5,6,7-tetrahydro-1-indenyl)zirconium ethoxide,
ethylenebis(4,5,6,7-tetrahydro-1-indenyl)methoxyzirconium chloride,
ethylenebis(4,5,6,7-tetrahydro-1-indenyl)ethoxyzirconium chloride, and
ethylenebis(4,5,6,7-tetrahydro-1-indenyl)methylzirconium ethoxide.

53. A solid catalyst for polymerizing an olefin or co-polymerizing olefins, wherein said solid catalyst is prepared by the process comprising
contacting an α-olefin with a composition obtained by mixing together an organoaluminum compound having a branched alkyl radical, an aluminoxane,
with the proviso that a ratio of the aluminum content in the aluminoxane to the aluminum content in the organoaluminum compound is in the range of 1.25 to 5.0,
and a fine-particle carrier, in an arbitrary order, and then adding a metallocene, as the only transition metal compound, represented by the formula (III):

$$R^1{}_kR^2{}_lR^3{}_mR^4{}_nM \quad\quad (III)$$

to the mixture to pre-polymerize the α-olefin and produce said solid catalyst;
wherein M is selected from the group consisting of titanium, zirconium, and hafnium; $R^1$ is a cyclopentadienyl radical optionally substituted with at least one $C_{1-4}$ hydrocarbon; $R^2$, $R^3$ and $R^4$ are independently selected from the group consisting of a cyclopentadienyl radical optionally substituted with at least one $C_{1-4}$ hydrocarbon, an aryl, an alkyl, a cycloalkyl, an aralkyl, a halogen, hydrogen, $OR^a$, $SR^b$, $NR^c{}_2$ and $PR^d{}_2$, wherein $R^a$, $R^b$, $R^c$ and $R^d$ are independently a hydrocarbon radical selected from the group consisting of an alkyl, a cycloalkyl, an aryl and an aralkyl or silyl, with the proviso that $R^c$ and $R^d$ may, taken together, form a ring; k is at least 1; and the sum of k, l, m, and n equals 4; and wherein $R^1$ and $R^2$ may be bonded by an intervening lower alkylene radical when $R^2$ is a cyclopentadienyl radical optionally substituted with at least one $C_{1-4}$ hydrocarbon.

54. The solid catalyst according to claim 53 wherein the fine-particle carrier and the organoaluminum compound are mixed before the addition of the aluminoxane.

55. The solid catalyst according to claim 53 wherein M is zirconium.

56. The solid catalyst according to claim 53 wherein the α-olefin is contacted with the mixture in the presence of a hydrocarbon solvent.

57. The solid catalyst according to claim 53 wherein the fine-particle carrier comprises an inorganic oxide having an average particle diameter in the range of from 1 to 300 micrometers.

58. The solid catalyst according to claim 57 wherein said oxide comprises at least an oxide selected from the group consisting of SiO$_2$, Al$_2$O$_3$, and MgO.

59. The solid catalyst according to claim 53 wherein the fine-particle carrier comprises an organic polymer and has an average particle diameter in the range of from 1 to 300 micrometers.

60. The solid catalyst according to claim 59 wherein said organic polymer comprises a polyolefin.

61. The solid catalyst according to claim 53 wherein said aluminoxane comprises a compound represented by the formula (I) or (II):

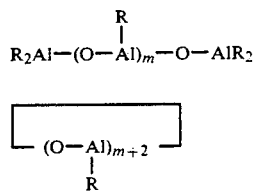

(I)

(II)

wherein R is a C$_{1-20}$ hydrocarbon radical and m has a value of 2 to 50.

62. The solid catalyst according to claim 53 wherein the cyclopentadienyl radical is selected from the group consisting of cyclopentadienyl, methylcyclopentadienyl, ethylcyclopentadienyl, dimethylcyclopentadienyl, pentamethylcyclopentadienyl, indenyl, and tetrahydroindenyl radicals.

63. The process according to claim 53 wherein the transition metal compound is selected from the group consisting of
ethylenebis(indenyl)ethoxyzirconium, chloride,
ethylenebis(4,5,6,7-tetrahydro-1-indenyl)ethoxyzirconium chloride,
ethylenebis(indenyl)dimethylzirconium,
ethylenebis(indenyl)diethylzirconium,
ethylenebis(indenyl)diphenylzirconium,
ethylenebis(indenyl)dibenzylzirconium,
ethylenebis(indenyl)methylzirconium monobromide,
ethylenebis(indenyl)ethylzirconium monochloride,
ethylenebis(indenyl)benzylzirconium monochloride,
ethylenebis(indenyl)methylzirconium monochloride,
ethylenebis(indenyl)zirconium dichloride,
ethylenebis(indenyl)zirconium dibromide,
ethylenebis(4,5,6,7-tetrahydro-1-indenyl)dimethylzirconium,
ethylenebis(4,5,6,7-tetrahydro-1-indenyl)methylzirconium monochloride,
ethylenebis(4,5,6,7-tetrahydro-1-indenyl)zirconium dichloride
ethylenebis(4,5,6,7-tetrahydro-1-indenyl)zirconium dibromide,
ethylenebis(4-methyl-1-indenyl)zirconium dichloride,
ethylenebis(5-methyl-1-indenyl)zirconium dichloride,
ethylenebis(6-methyl-1-indenyl)zirconium dichloride,
ethylenebis(7-methyl-1-indenyl)zirconium dichloride,
ethylenebis(5-methoxy-1-indenyl)zirconium dichloride,
ethylenebis(2,3-dimethyl-1-indenyl)zirconium dichloride,
ethylenebis(4,7-dimethyl-1-indenyl)zirconium dichloride,
ethylenebis(4,7-dimethoxy-1-indenyl)zirconium dichloride,
ethylenebis(indenyl)zirconium dimethoxide,
ethylenebis(indenyl)zirconium diethoxide,
ethylenebis(indenyl)methoxyzirconium chloride,
ethylenebis(indenyl)ethoxyzirconium chloride,
ethylenebis(indenyl)methylzirconium ethoxide,
ethylenebis(4,5,6,7-tetrahydro-1-indenyl)zirconium dimethoxide,
ethylenebis(4,5,6,7-tetrahydro-1-indenyl)zirconium ethoxide,
ethylenebis(4,5,6,7-tetrahydro-1-indenyl)methoxyzirconium chloride,
ethylenebis(4,5,6,7-tetrahydro-1-indenyl)ethoxyzirconium chloride, and
ethylenebis(4,5,6,7-tetrahydro-1-indenyl)methylzirconium ethoxide.

64. A process for producing a solid catalyst for polymerizing an olefin or co-polymerizing olefins produced by the process comprising
contacting an α-olefin with a mixture obtained by mixing an organoaluminum compound having a branched alkyl radical, an aluminoxane,
with the proviso that a ratio of the aluminum content in the aluminoxane to the aluminum content in the organoaluminum compound is in the range of 1.25 to 5.0,
a fine-particle carrier, and a metallocene, as the only transition metal compound, represented by the formula (III):

$$R^1{}_kR^2{}_lR^3{}_mR^4{}_nM$$ (III)

to pre-polymerize the α-olefin and produce said solid catalyst;
wherein M is selected from the group consisting of titanium, zirconium, and hafnium; R$^1$ is a cyclopentadienyl radical optionally substituted with at least one C$_{1-4}$ hydrocarbon; R$^2$, R$^3$ and R$^4$ are independently selected from the group consisting of a cyclopentadienyl radical optionally substituted with at least one C$_{1-4}$ hydrocarbon, an aryl, an alkyl, a cycloalkyl, an aralkyl, a halogen, hydrogen, OR$^a$, SR$^b$, NR$^c{}_2$ and PR$^d{}_2$, wherein R$^a$, R$^b$, R$^c$ and R$^d$ are independently a hydrocarbon radical selected from the group consisting of an alkyl, a cycloalkyl, an aryl and an aralkyl or silyl, with the proviso that R$^c$ and R$^d$ may, taken together, form a ring; k is at least 1; and the sum of k, l, m, and n equals 4; and wherein R$^1$ and R$^2$ may be bonded by an intervening lower alkylene radical when R$^2$ is a cyclopentadienyl radical optionally substituted with at least one C$_{1-4}$ hydrocarbon.

65. The process according to claim 64, wherein M is zirconium.

66. The process according to claim 64 wherein the α-olefin is contacted with the mixture in the presence of a hydrocarbon solvent.

67. The process according to claim 64 wherein the fine-particle carrier comprises an inorganic oxide having an average particle diameter in the range of from 1 to 300 micrometers.

68. The process according to claim 67 wherein said oxide comprises at least an oxide selected from the group consisting of SiO$_2$, Al$_2$O$_3$, and MgO.

69. The process according to claim 64 wherein the fine-particle carrier comprises an organic polymer and has an average particle diameter in the range of from 1 to 300 micrometers.

70. The process according to claim 69 wherein said organic polymer comprises a polyolefin.

71. The process according to claim 64 wherein said aluminoxane comprises a compound represented by the formula (I) or (II):

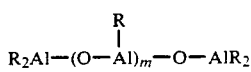

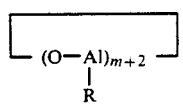

wherein R is a $C_{1-20}$ hydrocarbon radical and m has a value of 2 to 50.

72. The process according to claim 64 wherein the cyclopentadienyl radical is selected from the group consisting of cyclopentadienyl, methylcyclopentadienyl, ethylcyclopentadienyl, dimethylcyclopentadienyl, pentamethylcyclopentadienyl, indenyl, and tetrahydroindenyl radicals.

73. The process according to claim 64 wherein the transition metal compound is selected from the group consisting of
ethylenebis(indenyl)ethoxyzirconium, chloride,
ethylenebis(4,5,6,7-tetrahydro-1-indenyl)ethoxyzirconium chloride,
ethylenebis(indenyl)dimethylzirconium,
ethylenebis(indenyl)diethylzirconium,
ethylenebis(indenyl)diphenylzirconium,
ethylenebis(indenyl)dibenzylzirconium,
ethylenebis(indenyl)methylzirconium monobromide,
ethylenebis(indenyl)ethylzirconium monochloride,
ethylenebis(indenyl)benzylzirconium monochloride,
ethylenebis(indenyl)methylzirconium monochloride,
ethylenebis(indenyl)zirconium dichloride,
ethylenebis(indenyl)zirconium dibromide,
ethylenebis(4,5,6,7-tetrahydro-1-indenyl)dimethylzirconium,
ethylenebis(4,5,6,7-tetrahydro-1-indenyl)methylzirconium monochloride,
ethylenebis(4,5,6,7-tetrahydro-1-indenyl)zirconium dichloride
ethylenebis(4,5,6,7-tetrahydro-1-indenyl)zirconium dibromide,
ethylenebis(4-methyl-1-indenyl)zirconium dichloride,
ethylenebis(5-methyl-1-indenyl)zirconium dichloride,
ethylenebis(6-methyl-1-indenyl)zirconium dichloride,
ethylenebis(7-methyl-1-indenyl)zirconium dichloride,
ethylenebis(5-methoxy-1-indenyl)zirconium dichloride,
ethylenebis(2,3-dimethyl-1-indenyl)zirconium dichloride,
ethylenebis(4,7-dimethyl-1-indenyl)zirconium chloride,
ethylenebis(4,7-dimethoxy-1-indenyl)zirconium dichloride,
ethylenebis(indenyl)zirconium dimethoxide,
ethylenebis(indenyl)zirconium diethoxide,
ethylenebis(indenyl)methoxyzirconium chloride,
ethylenebis(indenyl)ethoxyzirconium chloride,
ethylenebis(indenyl)methylzirconium ethoxide,
ethylenebis(4,5,6,7-tetrahydro-1-indenyl)zirconium dimethoxide,
ethylenebis(4,5,6,7-tetrahydro-1-indenyl)zirconium ethoxide,
ethylenebis(4,5,6,7-tetrahydro-1-indenyl)methoxyzirconium chloride,
ethylenebis(4,5,6,7-tetrahydro-1-indenyl)ethoxyzirconium chloride, and
ethylenebis(4,5,6,7-tetrahydro-1-indenyl)methylzirconium ethoxide.

74. A process for producing a solid catalyst for polymerizing an olefin or co-polymerizing olefins, wherein said solid catalyst is prepared by the process comprising
contacting an α-olefin with a composition obtained by mixing together an organoaluminum compound having a branched alkyl radical, an aluminoxane, with the proviso that a ratio of the aluminum content in the aluminoxane to the aluminum content in the organoaluminum compound is in the range of 1.25 to 5.0,
and a fine-particle carrier, in an arbitrary order, and then adding a metallocene, as the only transition metal compound, represented by the formula (III):

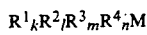

to the mixture to pre-polymerize the α-olefin and produce said solid catalyst;
wherein M is selected from the group consisting of titanium, zirconium, and hafnium; $R^1$ is a cyclopentadienyl radical optionally substituted with at least one $C_{1-4}$ hydrocarbon; $R^2$, $R^3$ and $R^4$ are independently selected from the group consisting of a cyclopentadienyl radical optionally substituted with at least one $C_{1-4}$ hydrocarbon, an aryl, an alkyl, a cycloalkyl, an aralkyl, a halogen, hydrogen, $OR^a$, $SR^b$, $NR^c{}_2$ and $PR^d{}_2$, wherein $R^a$, $R^b$, $R^c$ and $R^d$ are independently a hydrocarbon radical selected from the group consisting of an alkyl, a cycloalkyl, an aryl and an aralkyl or silyl, with the proviso that $R^c$ and $R^d$ may, taken together, form a ring; k is at least 1; and the sum of k, l, m, and n equals 4; and
wherein $R^1$ and $R^2$ may be bonded by an intervening lower alkylene radical when $R^2$ is a cyclopentadienyl radical optionally substituted with at least one $C_{1-4}$ hydrocarbon.

75. The process according to claim 74 wherein the fine-particle carrier and the organoaluminum compound are mixed before the addition of the aluminoxane.

76. The process according to claim 74 wherein M is zirconium.

77. The process according to claim 74 wherein the α-olefin is contacted with the mixture in the presence of a hydrocarbon solvent.

78. The process according to claim 74 wherein the fine-particle carrier comprises an inorganic oxide having an average particle diameter in the range of from 1 to 300 micrometers.

79. The process according to claim 78 wherein said oxide comprises at least an oxide selected from the group consisting of $SiO_2$, $Al_2O_3$, and MgO.

80. The process according to claim 74 wherein the fine-particle carrier comprises an organic polymer and has an average particle diameter in the range of from 1 to 300 micrometers.

81. The process according to claim 80 wherein said organic polymer comprises a polyolefin.

82. The solid catalyst according to claim 74 wherein said aluminoxane comprises a compound represented by the formula (I) or (II):

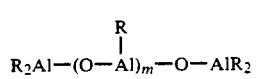

-continued

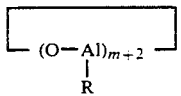

wherein R is a $C_{1-20}$ hydrocarbon radical and m has a value of 2 to 50.

83. The process according to claim 74 wherein the cyclopentadienyl radical is selected from the group consisting of cyclopentadienyl, methylcyclopentadienyl, ethylcyclopentadienyl, dimethylcyclopentadienyl, pentamethylcyclopentadienyl, indenyl, and tetrahydroindenyl radicals.

84. The process according to claim 74 wherein the transition metal compound is selected from the group consisting of
ethylenebis(indenyl)ethoxyzirconium chloride,
ethylenebis(4,5,6,7-tetrahydro-1-indenyl)ethoxyzirconium chloride,
ethylenebis(indenyl)dimethylzirconium,
ethylenebis(indenyl)diethylzirconium,
ethylenebis(indenyl)diphenylzirconium,
ethylenebis(indenyl)dibenzylzirconium,
ethylenebis(indenyl)methylzirconium monobromide,
ethylenebis(indenyl)ethylzirconium monochloride,
ethylenebis(indenyl)benzylzirconium monochloride,
ethylenebis(indenyl)methylzirconium monochloride,
ethylenebis(indenyl)zirconium dichloride,
ethylenebis(indenyl)zirconium dibromide,
ethylenebis(4,5,6,7-tetrahydro-1-indenyl)dimethylzirconium,
ethylenebis(4,5,6,7-tetrahydro-1-indenyl)methylzirconium monochloride,
ethylenebis(4,5,6,7-tetrahydro-1-indenyl)zirconium dichloride
ethylenebis(4,5,6,7-tetrahydro-1-indenyl)zirconium dibromide,
ethylenebis(4-methyl-1-indenyl)zirconium dichloride,
ethylenebis(5-methyl-1-indenyl)zirconium dichloride,
ethylenebis(6-methyl-1-indenyl)zirconium dichloride,
ethylenebis(7-methyl-1-indenyl)zirconium dichloride,
ethylenebis(5-methoxy-1-indenyl)zirconium dichloride,
ethylenebis(2,3-dimethyl-1-indenyl)zirconium dichloride,
ethylenebis(4,7-dimethyl-1-indenyl)zirconium dichloride,
ethylenebis(4,7-dimethoxy-1-indenyl)zirconium dichloride,
ethylenebis(indenyl)zirconium dimethoxide,
ethylenebis(indenyl)zirconium diethoxide,
ethylenebis(indenyl)methoxyzirconium chloride,
ethylenebis(indenyl)ethoxyzirconium chloride,
ethylenebis(indenyl)methylzirconium ethoxide,
ethylenebis(4,5,6,7-tetrahydro-1-indenyl)zirconium dimethoxide,
ethylenebis(4,5,6,7-tetrahydro-1-indenyl)zirconium ethoxide,
ethylenebis(4,5,6,7-tetrahydro-1-indenyl)methoxyzirconium chloride,
ethylenebis(4,5,6,7-tetrahydro-1-indenyl)ethoxyzirconium chloride, and
ethylenebis(4,5,6,7-tetrahydro-1-indenyl)methylzirconium ethoxide.

* * * * *

UNITED STATES PATENT AND TRADEMARK OFFICE
CERTIFICATE OF CORRECTION

PATENT NO. : 5,126,301
DATED : June 30, 1992
INVENTOR(S) : TOSHIYUKI TSUTSUI

It is certified that error appears in the above-identified patent and that said Letters Patent is hereby corrected as shown below:

On the title page:
Item [73] Assignee: "Mitsui Petrochemical Industries, Inc." should read --Mitsui Petrochemical Industries, Ltd.--

Signed and Sealed this

Twelfth Day of October, 1993

Attest:

BRUCE LEHMAN

Attesting Officer    Commissioner of Patents and Trademarks